United States Patent
Castro et al.

(10) Patent No.: US 6,671,821 B1
(45) Date of Patent: Dec. 30, 2003

(54) BYZANTINE FAULT TOLERANCE

(75) Inventors: Miguel Castro, Cambridge (GB); Barbara Liskov, Waltham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 553 days.

(21) Appl. No.: 09/717,755

(22) Filed: Nov. 21, 2000

Related U.S. Application Data

(60) Provisional application No. 60/166,859, filed on Nov. 22, 1999, now abandoned.

(51) Int. Cl.[7] .............................................. H02H 3/05
(52) U.S. Cl. ............................. 714/4; 714/11; 714/12; 714/21
(58) Field of Search ............................... 714/4, 11, 12, 714/21

(56) References Cited

U.S. PATENT DOCUMENTS

| | | | |
|---|---|---|---|
| 4,569,015 A | * 2/1986 | Dolev et al. | 709/201 |
| 5,261,085 A | 11/1993 | Lamport | |
| 5,269,016 A | 12/1993 | Butler et al. | |
| 5,469,507 A | 11/1995 | Canetti et al. | |
| 5,598,529 A | 1/1997 | Garay | |
| 5,625,692 A | 4/1997 | Herzberg et al. | |
| 5,682,470 A | 10/1997 | Dwork et al. | |
| 5,991,414 A | 11/1999 | Garay et al. | |
| 6,178,522 B1 | * 1/2001 | Zhou et al. | 714/12 |
| 6,192,472 B1 | * 2/2001 | Garay et al. | 713/165 |
| 6,351,811 B1 | * 2/2002 | Groshon et al. | 713/176 |
| 6,487,678 B1 | * 11/2002 | Briskey et al. | 714/4 |
| 6,567,927 B1 | * 5/2003 | Brinkmann | 714/10 |

OTHER PUBLICATIONS

Bracha et al., "Asynchronous Consensus and Broadcast Protocols", Journal of Association of Computing Machinery, 22:824–840, 1985.
Kihlstrom et al., "The SecureRing Protocols for Securing Group Communication".
Lamport, L., "The Part–Time Parliament", 1989.
Malkhi et al., "Secure and Scalable Replication in Phalanx", AT&T Labs Research.
Ostrovsky et al., "How to Withstand Mobile Virus Attacks", ACM 0–89791–439–2/91/0007/0051, 1991.
Reiter, M., "The Rampart Toolkit for Building High–Integrity Services", Theory and Practice in Distributed Systems, pp. 99–110, Springer–Verlag, 1995.
Schneider, F., "Implementing Fault–Tolerance Services Using the State Machine Approach: A Tutorial", ACM Computing Surveys, vol. 22, No. 4, 1990.

* cited by examiner

*Primary Examiner*—Scott Baderman
*Assistant Examiner*—Emerson Puente
(74) *Attorney, Agent, or Firm*—Fish & Richardson P.C.

(57) ABSTRACT

A new approach for asynchronous state-machine replication in a fault-tolerant system offers both integrity and high availability in the presence of Byzantine faults. The approach also improves the security of previous systems by recovering replicas proactively without necessarily identifying that they have failed or been attacked. This proactive recovery limits the time extent of a particular fault by regularly recovering replicas. In this way, the system works correctly even when all the replicas fail multiple times over the lifetime of the system, provided that less than ⅓ of the replicas are all faulty within a window of vulnerability. The approach also features an efficient implementation of message authentication that prevents an attacker from impersonating a replicated node that was faulty after that node recovers

12 Claims, 17 Drawing Sheets

BYZANTINE FAULT TOLERANCE

CROSS-REFERENCE TO RELATED APPLICATIONS

This application claims the benefit of U.S. Provisional Application No. 60/166,859 filed Nov. 22, 1999, now abandoned.

STATEMENT AS TO FEDERALLY SPONSORED RESEARCH

This invention was made with government support under Grant Number F30602-98-1-0237 awarded by the Department of the Air Force and Contract Number DABT63-95-C-0005 awarded by the Department of the Army. The government has certain rights in the invention.

BACKGROUND

This invention relates to fault-tolerant computing using replicated services.

The growing reliance of industry and government on online information services makes the consequence of failures of these services more serious. Furthermore, malicious attacks on these services have become increasingly attractive to some. One approach to design of fault-tolerant systems that are resistant to faults and malicious attacks is called "replication." In replication, services are redundantly implemented, or replicated, at a number of nodes, such as on different computers on a computer network. The replicated system as a whole continues to respond correctly to client requests even when some of the replicas are faulty or have been compromised by an attack. In some approaches to replication, the replicated nodes, or "replicas," operate asynchronously, while in others, the replicas operate in lock-step. Byzantine-fault-tolerant replication addresses not only faults at replicated nodes which result in the nodes not responding to requests ("fail-stop" errors), but also addresses the situation in which a node appears to be operating correctly but in fact is not providing correct responses. A node may be providing incorrect responses due to errors in implementation of the node (i.e., "bugs") or may be operating incorrectly as a result of an attack by a malicious outside party. Attackers may compromise the correct operation of a node, and may also disrupt communication between nodes, overload nodes in "denial of service" attacks, or send messages to nodes attempting to impersonate other correctly operating nodes.

Prior asynchronous replication-based algorithms have been proposed which guarantee integrity for the service provided that greater than $2/3$ of the replicas remain fault-free during the lifetime of the service.

Some prior systems actively attempt to identify which nodes are faulty and remove them from service. With fewer nodes remaining, the system may be less tolerant of further faults. One mode of attack on such a system is to attempt to have the system remove nodes that are not in fact faulty from service, thereby making it easier to compromise the remaining nodes.

A number of prior systems have been tailored to services that essentially provide "write," "read," and "lock" services for a data store. A client uses these primitives to implement more complex operations on the data store.

In order to ensure authenticity of messages passed between replicated nodes, some replicated systems use public key cryptography to sign messages so that any recipient that has a trusted copy of the public key for a sender can authenticate a message that was received from the sender, possibly via another node. Signing messages using public key techniques can be computationally expensive.

SUMMARY

In a general aspect, the invention provides a new approach for asynchronous state-machine replication in a fault-tolerant system. The approach offers both integrity and high availability in the presence of Byzantine faults. The approach also improves the security of previous systems by recovering replicas proactively without necessarily identifying that they have failed or been attacked. This proactive recovery limits the time extent of a particular fault by regularly recovering replicas. In this way, the system works correctly even when all the replicas fail multiple times over the lifetime of the system, provided that less than $1/3$ of the replicas are all faulty within a window of vulnerability. The approach also features an efficient implementation of message authentication that prevents an attacker from impersonating a replicated node that was faulty after that node recovers.

In one aspect, in general, the invention is a method for fault tolerant operation of a distributed server system that includes N asynchronous servers that may experience faults. The method includes receiving a series of requests from a client over a time interval associated with the requests. At each of the N servers, some or all of the client requests are processed. For each of the requests processed at a server, a state of a state machine at that server is updated according to the request and a response is transmitted to the client. The method also includes resetting each of the N servers repeatedly during the time interval. Resetting a server includes establishing the state of the state machine at that server using data stored at other of the servers so that the state at that server corresponds to a common state of the server system. When (a) for a predetermined duration time window, fewer than N/3 of the server systems experience faults in any time window of the time interval of the requests of that predetermined duration, and (b) N/3 or more of the N servers experience faults at some time during the time interval of the requests, the N servers provide responses to the client that are sufficient for the client to determine correct responses to each of the series of requests.

The invention can include one or more of the following features.

The faults experienced by the N servers include Byzantine faults.

The faults experienced by the N servers include faults resulting from denial-of-service attacks in which communication between the servers is interrupted.

The method further includes, during the time interval of the requests, identifying a series of master servers from the N servers such that different servers are identified as master servers at different times. For each of the requests from the client, the method includes (a) receiving the request at a master server, (b) establishing a common sequence number for the request among greater than $2/3$ of the N servers, and (c) processing the request at servers at which the common sequence number has been established. When $1/3$ or fewer of the N servers are faulty, this results in greater than $1/3$ of the N servers being both not faulty and transmitting a response to the client.

Establishing the state of the state machine at a server that has been reset using data stored at other of the servers includes partitioning the state into separate parts. The values of the state for the separate parts are retained from prior to resetting the server. For each separate part at that the server, a digest characterizing the retained value of the state in that part is computed. A sufficient number of digests of that part of the state at other of the N servers are received from those other servers to determine whether the digest matches the common value of that part of the state. If for any part of the state the digest computed at the server does not match the digest of the common value of that part of the state, the values of at least some of that part of the state are transferred from another of the N servers.

Establishing the state of the state machine at a server that has been reset using data stored at other of the servers further includes partitioning the state into a hierarchy of parts, such that parts of the state are partitioned into sub-parts. If the digest for any part of the state that is computed at the server does not match the digest of the common value of that part of the state, a digest characterizing each of the sub-parts of that part is computed. A sufficient number of digests of those sub-parts of the state at other of the N servers are received from those other servers to determine whether the digests match the common values of those sub-parts of the state.

Processing at least some of the requests include processing a complex operation involving multiple updates to the state machine according to each of those requests.

The method further includes, at each of the N servers, computing symmetric keys for communicating with each of the other of the N servers, and distributing the symmetric keys to the other servers. The steps of computing and distributing the keys are repeated during the time interval.

Distributing the symmetric keys to the other servers includes encrypting the keys in a message using public key cryptography.

In another aspect, in general, the invention is a method for fault tolerant operation of a distributed computer system. The distributed computer system includes one or more clients and 3F+1 server nodes, which in normal operation operate asynchronously and implement a common state machine and during faulty operation F or fewer of the server nodes are concurrently faulty. The method includes receiving a request from a client at a designated master node of the 3F+1 server nodes. A common sequence number for the request is established among at least 2F+1 of the 3F+1 server nodes using a three-phase message exchange. During the first phase a first message is sent from the designated master node to other of the server nodes identifying the received request. During a second phase a second message is sent from each non-faulty server node that received the first message to all other of the server nodes. During a third phase, a third message is sent from each of the non-faulty server nodes that received the second message to all other of the server nodes. At each of F+1 or more of the 3F+1 server nodes that are not faulty and that have received the third message, the request is processed and a result is transmitted to the client.

The invention can include one or more of the following features.

The steps of receiving a request from a client, establishing a common sequence number for the request, and processing and transmitting the result are repeated for multiple subsequent requests.

Establishing the common sequence number for a subsequent request occurs prior to completion of the processing of a request received prior to that request.

The invention includes one or more of the following advantages:

Proactive recover of replicated nodes has an advantage of preventing an attacker from slowly compromising the over- all service by corrupting ⅓ or more of the replicated nodes without being detected. By regularly recovering each node, even if it does not appear to have been corrupted, an attacker must take over ⅓ of the nodes within a finite time window. The shorter the window, the more difficult it is for the attacker to succeed. This window of vulnerability can be made very small under normal load conditions (e.g., a few minutes).

The approach also provides a mechanism for tolerating faults caused by software bugs in the implementations of the replicas. This mechanism is further enhanced if multiple implementations are used for various of the replicas, in which case a particular software bug is less likely to be present in all the implementations.

By implementing services that implement complex operations, the system does not depend on correct operation of the clients. For example, if only primitive services were provided and the clients were relied upon to perform correct sequences of those primitive operations to effect complex operations, the system could be vulnerable to corruption if a client were faulty or subject to an attack. In a particular example, a file system service providing complex operations which guarantee that the meta-data (e.g., inodes) of the file system satisfy particular invariants may be less vulnerable to corruption by a client than would be a system in which the client is responsible for maintaining the consistency of the meta-data.

The approach also has the advantage of providing detection of denial-of-service attacks aimed at increasing the window of vulnerability. Replicas can time how long a recovery takes and alert their administrator if it exceeds some pre-established bound.

The approach also provides an efficient mechanism for detecting when the state at a replica has been corrupted, and for recovering the state from other of the replicas without necessarily requiring that the entire state be transferred to the corrupted replica.

Proactive recovery of replicas also prevents the service from being compromised by an attack that escapes detection unless the attack compromises more than ⅓ of the replicas within a small time window.

Using symmetric cryptography for messages between the replicas can be more efficient than using public key cryptography for all messages. The approach provides an efficient mechanism for authenticating a message that has passed through a possibly corrupted replica without requiring that the message be encrypted using the public key of the originator of the message.

Each replica can operate with a bounded storage and performs garbage collection to enforce the bound. If necessary, for example in the presence of a Byzantine fault, deleted or corrupted state can be recovered from other of the replicas.

Other features and advantages of the invention are apparent from the description and drawings, and from the claims.

DESCRIPTION OF DRAWINGS

FIG. 2A is a diagram that illustrates a client sending a request to the primary replica;

FIG. 2B is a diagram that illustrates a first of three phases by which the primary replica atomically multicasts the request to the backup replicas;

FIGS. 2C–D are diagrams that illustrate a second and a third phase, respectively, of the three phases of the atomic multicast;

FIG. 2E is a diagram that illustrates replicas sending replies to the request to the client;

FIG. 5A is a diagram that illustrates a client sending a request to the primary replica and the first of three phases my which the primary replica atomically multicasts the request to the backup replicas;

FIGS. 5B–C are diagrams that illustrate a second and a third phase, respectively, of the three phases of the atomic multicast;

FIG. 5D is a diagram that illustrates the replicas sending replies to the request to the client;

FIG. 7A is a diagram that illustrates a client sending a request to the faulty primary replica;

FIG. 7B is a diagram that illustrates a client multicasting the request to all the replicas, and the replicas sending the request to the (faulty) primary replica;

FIG. 7C is a diagram that illustrates backup replicas exchanging view change messages;

FIG. 7D is a diagram that illustrates exchange of view change acknowledgements and new view messages by which a backup replica assumes the role of a primary replica;

DESCRIPTION

Figure 1:
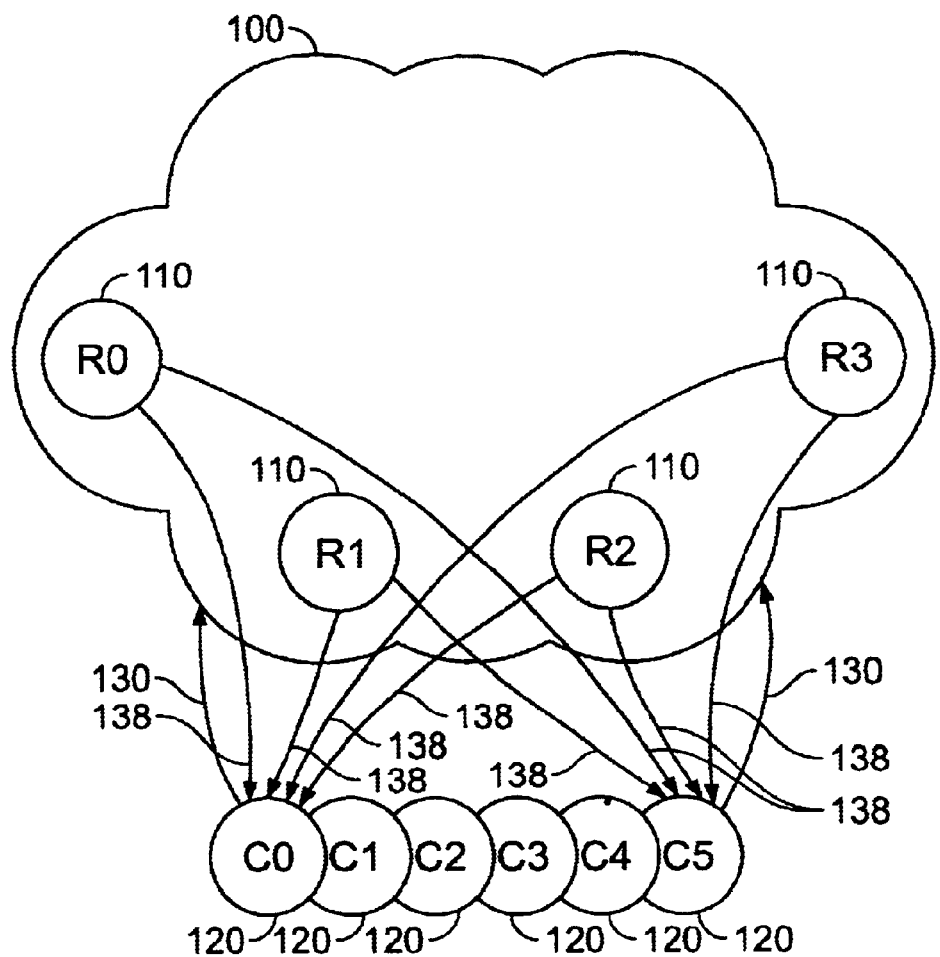
FIG. 1 is a diagram of a fault-tolerant system that includes a number of replicas and provides services to a number of clients.

A fault-tolerant system implemented according to this invention makes use of a form of asynchronous state machine replication. A service provided by the system is modeled as a state machine that is replicated at a number of different server nodes, called "replicas," in an asynchronous distributed system. Nodes send messages to one another, but messages may be lost, delayed, duplicated, or delivered out of order. In this embodiment, the nodes are hosted on separate computers coupled by a data network. In alternative embodiments, the nodes are executed on separate processors within a single computer, and in yet other embodiments, the nodes are implemented as separate software modules executing on a common processor.

The system implements a replicated service that has a state that completely characterizes the effect of past operations of the service on future operations. The service performs operations at the request of clients. Depending on the particular operation, a client may supply arguments for performing the operation, and performing the operation may change the state of the service.

A data-storage service is a simple example of a service that may be provided by the system. The service can store values to or retrieve values from locations in a data storage. The state of such a service is then the values stored at all the locations of the data storage. Write operations modify the service state according to a value provided by the client, and a read operation accesses the service state for the client.

In systems implemented according to this invention, a service is not limited to such simple examples. In particular, the service operations that are performed at the request of clients are not restricted to be simple reads and writes of portions of the service state. The service operations can perform arbitrary deterministic computations using the state and operation arguments.

An example of a more complex service that can be implemented according to this invention is a file system. A file system includes both data stored in the files, as well as meta-data that characterizes, for example, which characterizes how the files are arranged in the file system. For example the meta-data can include "inodes" that identify which portions of the file system are associated with which files. This meta-data must satisfy particular invariants for the file system to function correctly. The complex operations provided by the service are such that they guarantee that the meta-data continue to satisfy the invariants.

From the point of view of the clients, each replica is deterministic in its processing of requests for the clients. That is, the execution of a requested operation in a given observable state and with a given set of arguments always produces the same result and changes the observable state in the same way. Also, each replica starts in the same state. The system operates such that non-faulty replicas execute operations in the same order, thereby resulting in their states tracking one another. In the case of a recovery of a replica, for example after a failure of that replica, the system can restore the state of at a replica so that it can continue operating.

It should be understood that the replicas may further include state that is not observable to the clients, and may in fact exhibit non-deterministic behavior in the non-observable portion of their state. Furthermore, the non-observable state may be different at different replicas, for example, if those different replicas execute different implementations of the service, which present the same observable behavior to the clients.

Referring to FIG. 1, fault-tolerant system 100 provides a service to a number of clients 120. Fault-tolerant system includes a number of replicas 110 which are denoted by the set R. In the description of that follows, R includes four replicas, R0, R1, R2, and R4, which make up fault-tolerant system 100. This system with four replicas is designed to tolerate one fault of a replica "at a time." As will be discussed more precisely below, the system is designed to operate correctly with no more than one fault in a fixed sliding time window of "vulnerability." In various embodiments, fault-tolerant system 100 has more than four replicas according to this invention. An embodiment with $|R|=3f+1$ replicas can tolerate f faulty replicas within a window of vulnerability.

Any number of clients 120, labeled C0, C1, . . . independently send requests to the system to perform operations on its behalf. Any number of these clients can be faulty without compromising the correct operation of fault-tolerant system 100.

In operation, a client 120 sends a request to fault-tolerant system 100 requesting that an operation be performed on its behalf. In FIG. 1, clients C0 and C5 are illustrated each sending a request 130 to fault tolerant system 100. Although not illustrated in FIG. 1, requests 130 are eventually distributed to the non-faulty replicas 110. The system ensures that replicas 110 start in the same state and that non-faulty replicas execute the requested operations in the same order. Replicas 110 send the results of executing the requested operations directly to the client 120 that made the request. The client waits for replies with the same result from f+1 (here f+1=2) different replicas 110. At most f replicas are faulty, therefore at least one of these f+1 replicas is not faulty, and therefore the same result received from the f+1 replicas is the correct result of the operation.

Operation of fault-tolerant system 100 guarantees that all non-faulty replicas 110 agree on a total order for the execution of requests from clients 120 despite failures of nodes and failures and other communication characteristics between the nodes. This embodiment uses a primary-backup mechanism to achieve this. Generally, at any "time" one replica 110 is designated to be the primary replica and the remaining replicas are backups. The primary replica determines the order in which requested operations are executed by the replicas by assigning a sequence number to each request received from any of the clients 120.

As will be described in detail below, the replicas move through a succession of configurations called "views," which are numbered consecutively, v=0, 1, 2, . . . Other than during transitions during which different replicas may change their views at somewhat different times, all the non-faulty replicas that are in communication with a sufficient number of other replicas generally operate in the same view.

In a particular view exactly one replica is designated to be the primary replica and the others are backup replicas. In this embodiment, the index of the primary replica, p, is a deterministic function of the view index p=v mod |R|. Therefore, the role of primary replica "rotates" among the available replicas in successive views. From time to time the replicas all move to a next view, generally as a result of a fault or apparent fault in the primary replica in a current view.

Figure 2A:
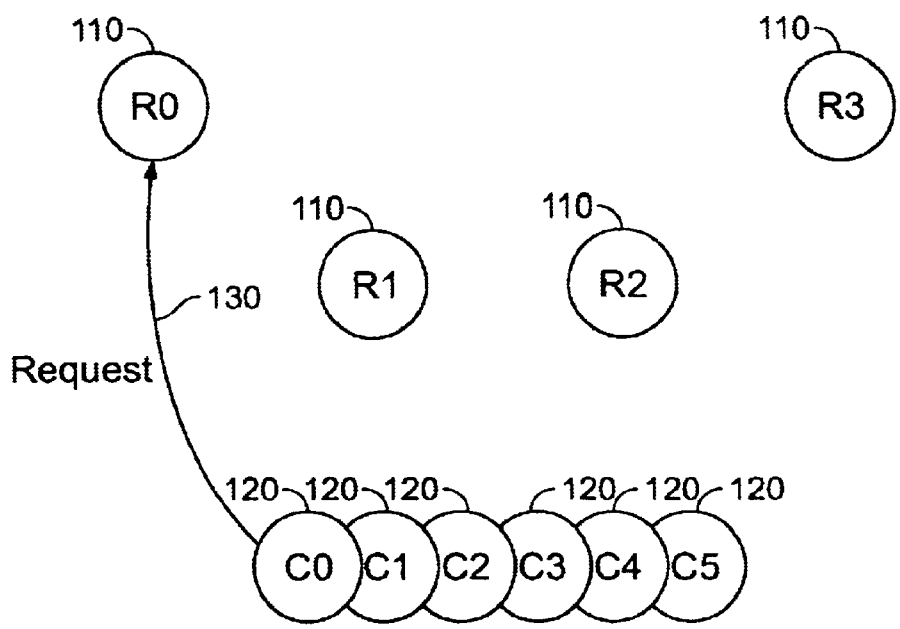
FIGS. 2A–E are diagrams that illustrate normal operation of the fault-tolerant system when no replica is faulty.
Figure 2B:
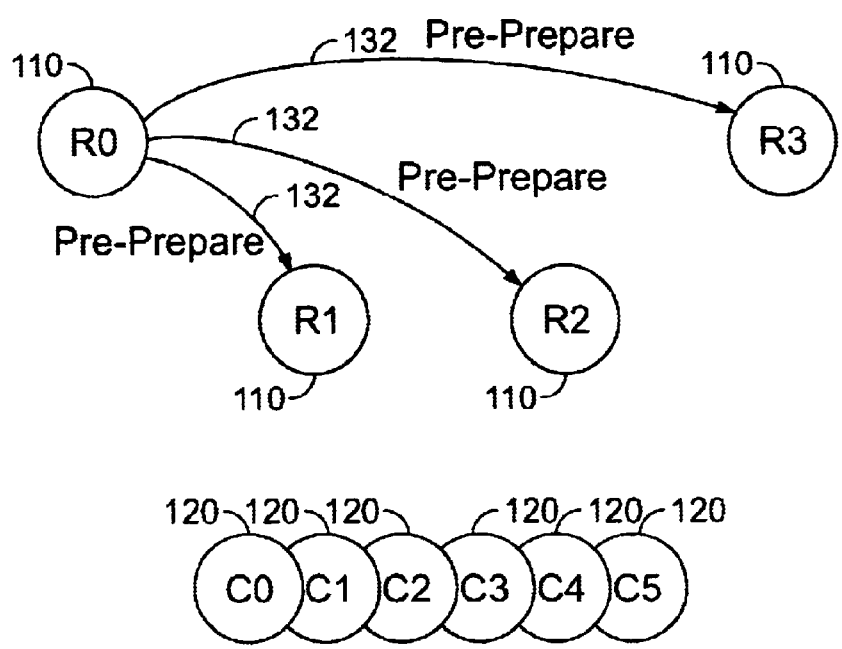
Figure 2C:
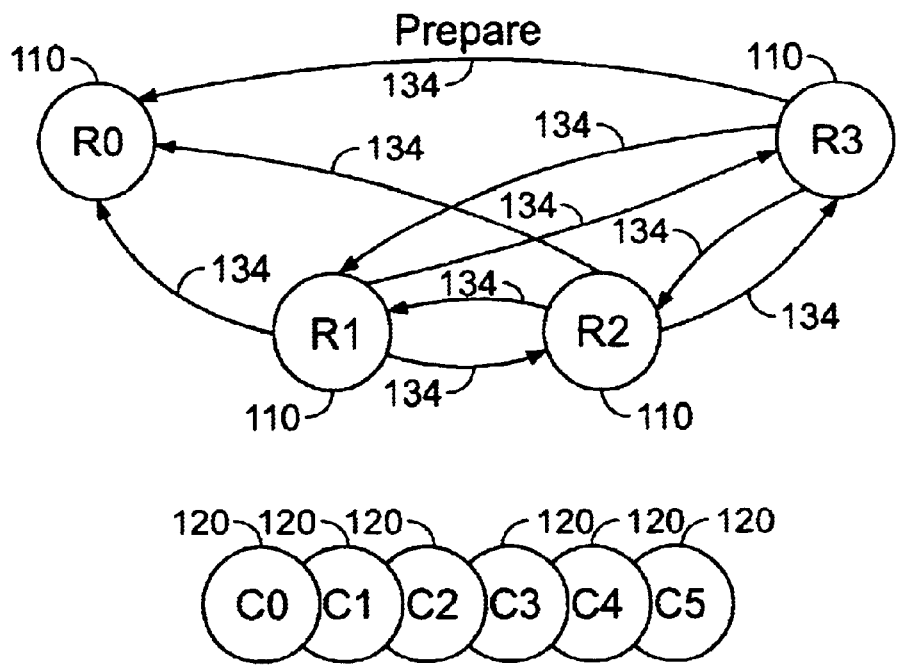
Figure 2D:
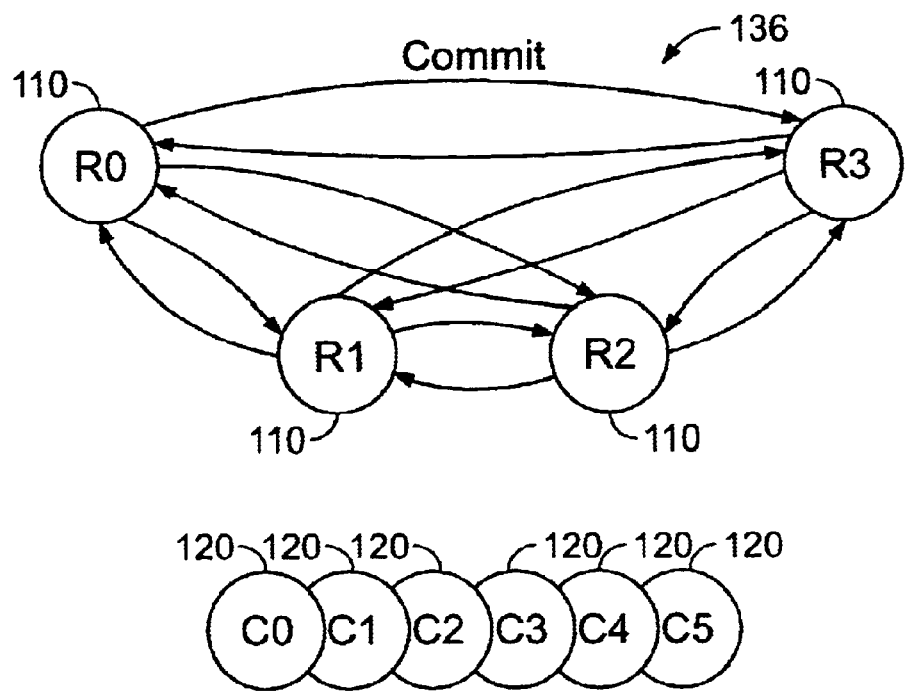
Figure 2E:
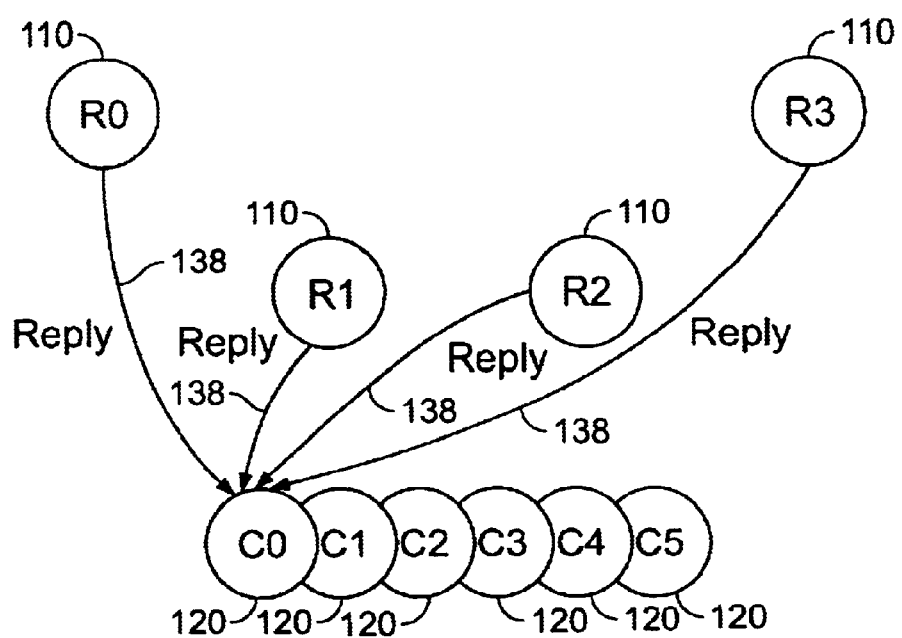
Figure 3:
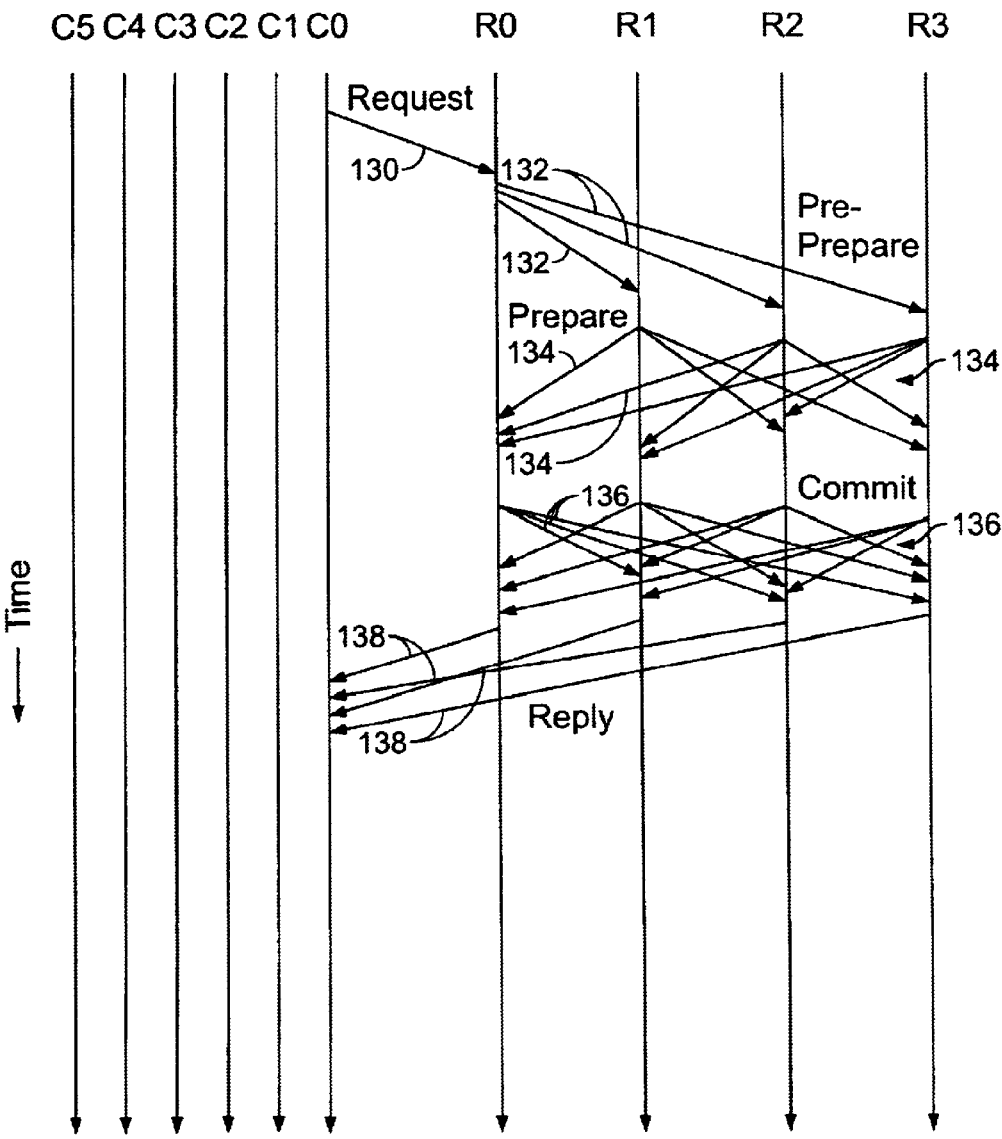
FIG. 3 is a timing diagram that illustrates normal operation of the fault-tolerant system when no replicas are faulty.
Figure 4:
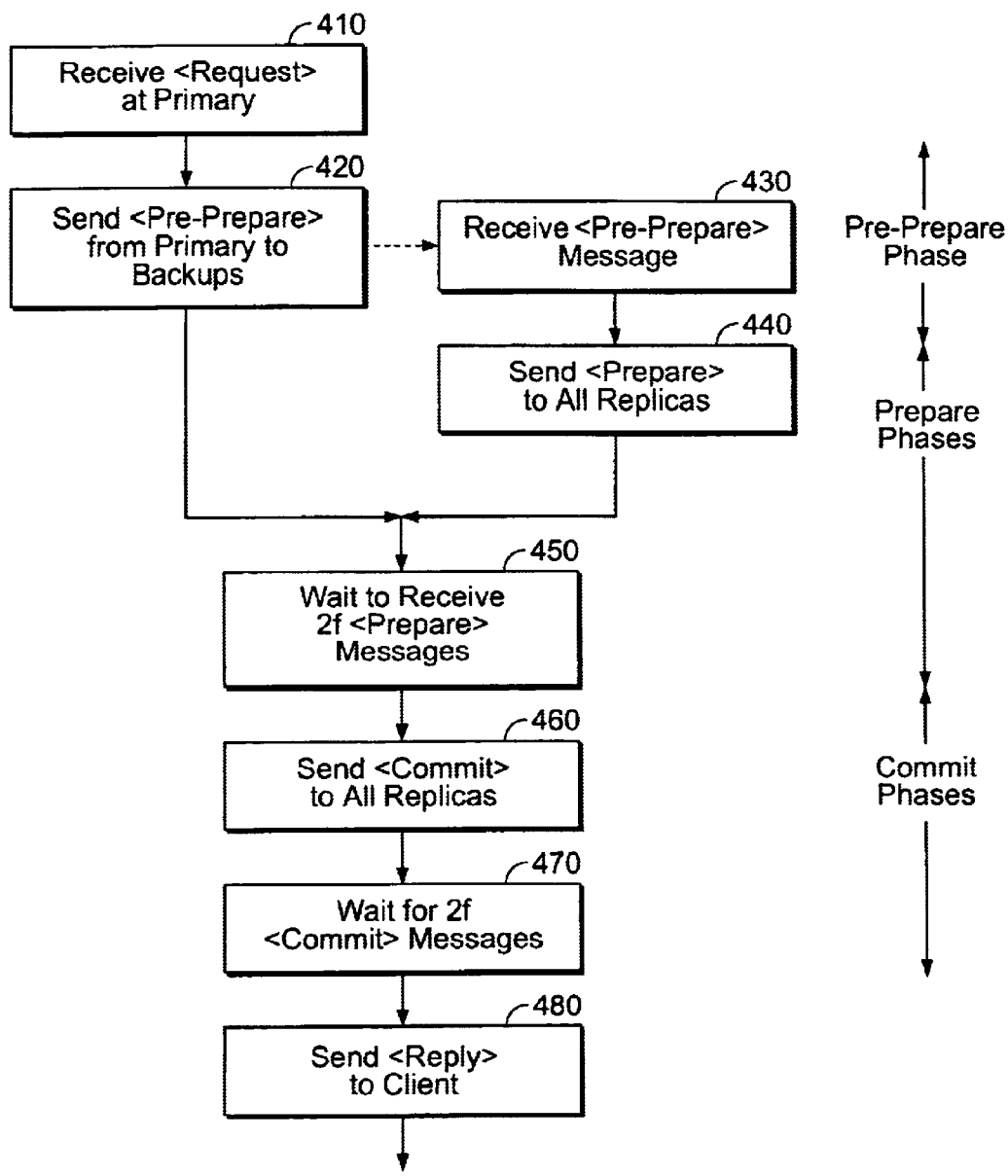
FIG. 4 is a flowchart for normal operation of replicas in the fault-tolerant system.

Normal operation of the system when no replicas are faulty is illustrated in FIGS. 2A–E, which illustrates clients 120 and replicas 110, FIG. 3, which shows timing of messages passing between the replicas, and FIG. 4, which is a flowchart illustrating operation of the primary and backup replicas.

Referring to FIGS. 2A–E, in normal operation, a client 120 sends a request 130 to the primary replica 110 (FIG. 2A) and waits to receive f+1 or more replies 138 with the same answer from replicas 110 (FIG. 2E). In FIGS. 2A and E, client C0 is illustrated sending a request to primary replica R0 and receiving replies from all replicas R0–R4. Situations in which the primary replica 110 to which client 120 sends the request is faulty, fails to receive the request, receives multiple copies of the request, or is no longer the primary because of a view change are discussed further below.

Referring to FIG. 3, an example to the timing of messages passed between client and replicas is shown for the scenario illustrated in FIGS. 2A–E. In FIG. 3, time runs from top to bottom of the figure. The vertical lines labeled C0–C5 represent clients 120 and the vertical lines labeled R0–R4 represent replicas 110. Arrows passing between the vertical lines represent messages passing between the replicas. These arrows in FIG. 3 and arcs in FIGS. 2A–E use like reference numerals to represent like messages.

Request message 130 sent from client C0 120 to primary replica R0 110 has the form <REQUEST,o,t,c> where o is the operation being requested (including any arguments for the operation), t is a timestamp, and c identifies the requesting client. Timestamps are totally ordered for a particular client, but are not necessarily synchronized across different clients. Messages passing between replicas make use of cryptographic techniques to ensure authenticity of the messages. Discussion of the cryptographic techniques is deferred in this initial discussion for ease of explanation of the approach.

Referring to FIGS. 2B, 3, and 4, when primary replica R0 110 receives Request message 130 from client 120 (FIG. 4 step 410), it starts a three-phase protocol to atomically multicast the request to backup replicas 110. The three phases of a request are called Pre-prepare, Prepare, and Commit. The Pre-prepare and Prepare phases are generally used to totally order requests sent in the same view even when the primary, which proposes the ordering of requests, is faulty. The Prepare and Commit phases are generally used to ensure that requests that are committed at replicas are totally ordered across views. Regarding terminology used in the following description, a request is referred to as "prepared" or "committed" at a replica if it has completed the Prepare or Commit phases, respectively. A replica "prepares" or "commits" when it marks the request as prepared or committed in its storage at the end of the Prepare or Commit phases for the request, respectively. Note that different requests are in general in different phases, and the same request is not always in the same phase at different replicas.

Referring to FIG. 2B, when primary replica 110 receives Request message 130 from client 120, it starts the Pre-prepare phase by assigning a sequence number n to the request. Then, primary replica 110 multicasts a Pre-prepare message 132 to all the backup replicas 110 (FIG. 4 step 420), and marks the requests as pre-prepared with sequence number n in its internal storage. Pre-prepare message 132 has the form <PRE-PREPARE,v,n,d>, where v indicates the view of the primary replica in which the message is being sent, and d is a digest of Request message 130 received from client 120. The digests are computed with a collision-resistant has function. Primary replica 110 also broadcasts the request received from the client, either along with Pre-prepare message 132 or separately. For example, primary replica 110 may send the request received from client 120 to backup replicas 110 at a lower priority than the messages for the multicast protocol since the request will not be acted upon by a backup replica until at least one round-trip communication between the backup replica and the primary replica.

Referring to FIG. 2C, when a backup replica 110 receives Pre-prepare message 132 from primary replica 110 (FIG. 4 step 430), it accepts the message subject to conditions described below. Backup replica 110 then enters the Prepare phase for that request. Backup replica 110 multicasts a <PREPARE,v,n,d,i> message 134 (step 440), where i is the index of that backup replica and v, n, and dare as in the Pre-prepare message, to all other replicas 110, and it marks the request as pre-prepared with sequence number n in its storage. The conditions that must be satisfied for a backup replica to accept a Pre-prepare message include that the view index, v, in the received message must match that of the backup replica, and that the index n for the request must not have already been assigned to another request by the primary replica in the current view.

Each replica Ri 110, regardless of whether it is a backup that has received a Pre-prepare message or the primary replica which received the request from the client, waits to receive and accept 2f Prepare messages from other replicas (FIG. 4 step 450) to determine that at least a total of 2f backup replicas (including itself if it is a backup replica) have entered the Prepare phase for the request, that is, that the request is pre-prepared at at least 2f+1 replicas including itself and the primary replica. At this point replica Ri 110 completes the Prepare phase for the request, marks the request as prepared, and enters the Commit phase for the request. Note that of these 2f+1 replicas that have already pre-prepared the request, if at most f are faulty as is assumed for correct operation, then at least f+1 correctly operating replicas have pre-prepared the request. It can be shown that the protocol guarantees that the other non-faulty replicas will either prepare the same request or will not prepare any request with sequence number n in view v. As with. Pre-prepare messages, the replica accepts Prepare messages subject to conditions that include the view index in the Prepare message matching that replica's current view.

Referring to FIG. 2E, once a replica Ri 110 enters the Commit phase, it multicasts a <COMMIT,v,n,d,i> message to the other replicas (FIG. 4 step 460). When a replica 110 has accepted 2f Commit messages 136 from other replicas and it itself has prepared that request (step 470) the replica marks the request as committed. The protocol guarantees that the request is prepared with sequence number n in view v at least f+1 non-faulty replicas. Note that this ensures that in any set of 2f+1 replicas must include at least one of these f+1 replicas with sequence number n.

Once a request is committed by a replica, then if it has already committed and executed all requests with lower sequence numbers it can execute the request and send a <REPLY,v,t,c,i,r> message 138, with a result, r, and the timestamp t originally supplied by the client c, to client 120 that originally sent the request (FIG. 4 step 480). The current view index, v, and the id of the replica replying, i, are also included. The client waits for f+1 consistent replies 138. If a replica commits a request, but there are requests with lower sequence numbers that it has not yet committed, it waits until it has committed those requests and then executes the committed requests in consecutive order according to their sequence numbers.

In FIG. 3, the messages passing between replicas 110 are illustrated as occurring roughly "in step" and in distinct phases. Even when none of the replicas are faulty, delays or errors in communicating messages between replicas may result in the replicas being "out of step." Since a replica does not count on getting responses from f replicas which could be faulty, it moves onto the next phase before necessarily getting responses from all the other replicas in the previous phase.

Referring to FIGS. 5A–D and FIG. 6, a similar sequence of messages pass between replicas when one of the replicas is faulty as was described in fault-free operation with reference to FIGS. 2A–E and 3. In this example, replica R3 110, a backup replica in the current view, is faulty. Both the situations in which replica R3 does not respond to messages, and the situation in which is sends faulty messages are described below.

Figure 5A:
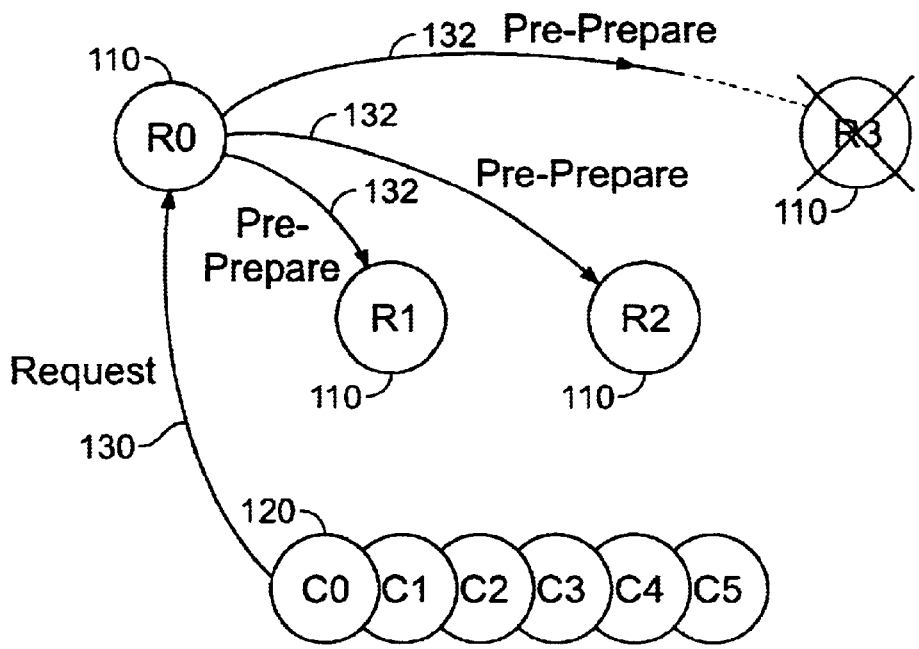
FIGS. 5A–D are diagrams that illustrates operation of the fault-tolerant system when a backup replica is faulty.

Referring to FIG. 5A, client C0 120 send a request 130 to primary replica R0 110, and the primary replica sends Pre-prepare messages 132 to the backup replicas 110 as in the fault-free example. In this example, replica R3 110 either does not receive the Pre-prepare message, or does not process it correctly.

Figure 5B:
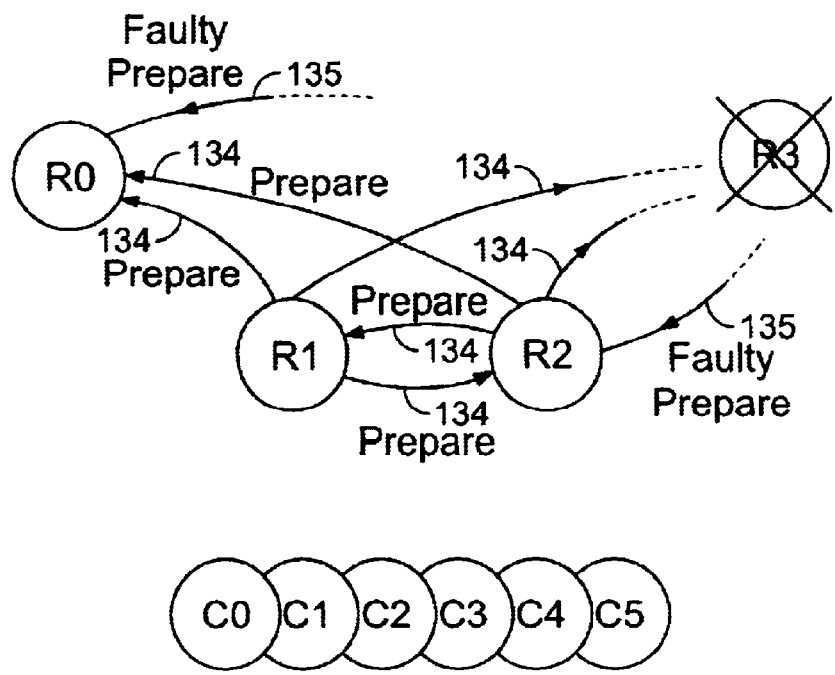
Figure 6:
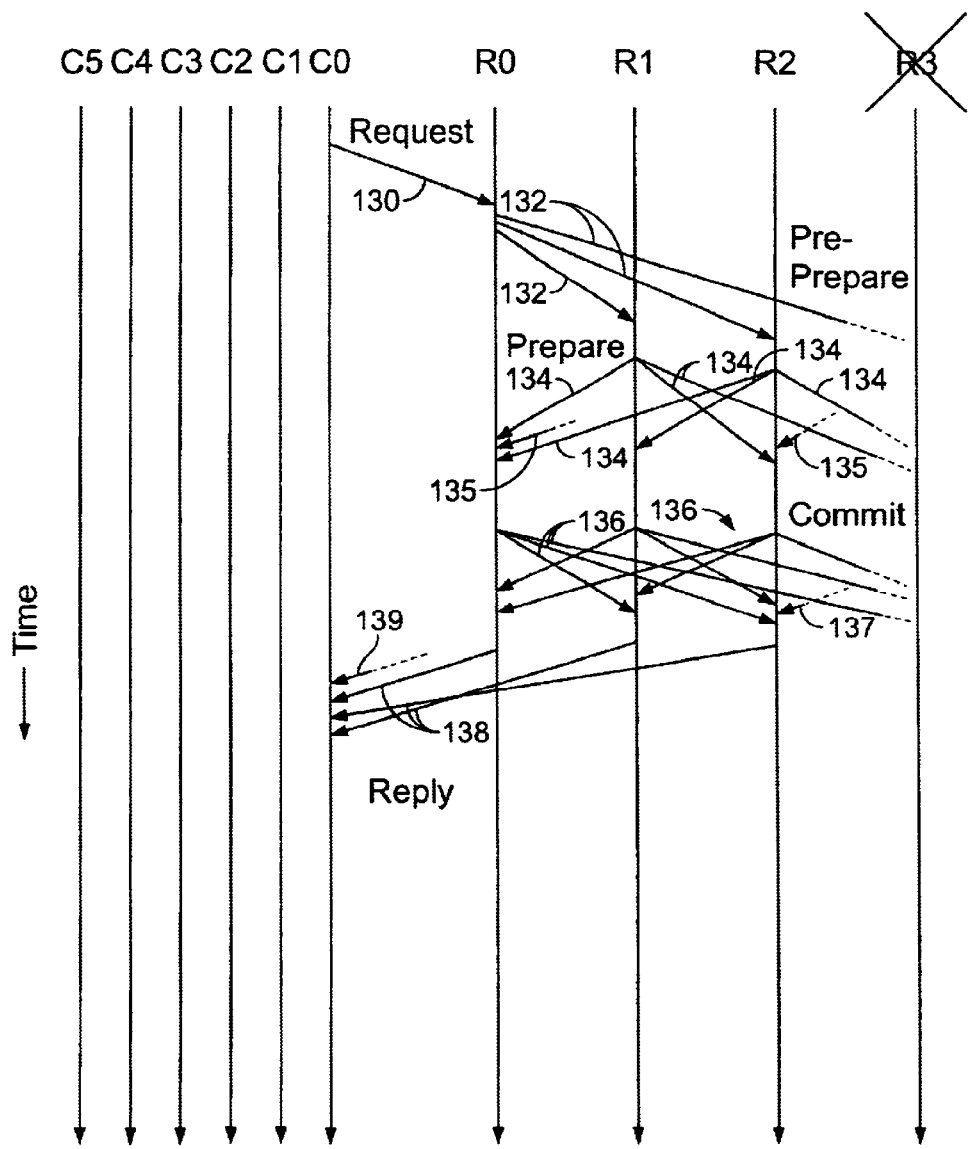
FIG. 6 is a timing diagram that illustrates operation of the fault-tolerant system when a backup replica is faulty.

Referring to FIG. 5B, in the Prepare phase, replicas R0–R2 110 either do not receive any Prepare message from replica R3 110, or receive a faulty Prepare message 135 that does not match the Prepare messages 134 from correctly functioning replicas. Referring to FIG. 6, consider primary replica R0 110 waiting to enter the Commit phase. Primary replica R0 must wait to receive 2f Prepare messages from non-faulty replica before it enters the Commit phase. As illustrated in FIG. 6, R0 first receives a correct Prepare message 134 from replica R1. Replica R0 can determine that the Prepare message is correct based on the request digest, sequence number, and authentication information that is included with the message. Authentication of messages is described in more detail below. Replica R0 is then illustrated to receive a faulty Prepare message 135. Finally, replica R0 receives the second correct Prepare message 134 from replica R2, and the R0 enters the Commit phase. After replica R2 received the correct Prepare message 134 from replica R1, it enters the Commit phase since it knows that R0, R1, and itself are all pre-prepared.

Figure 5C:
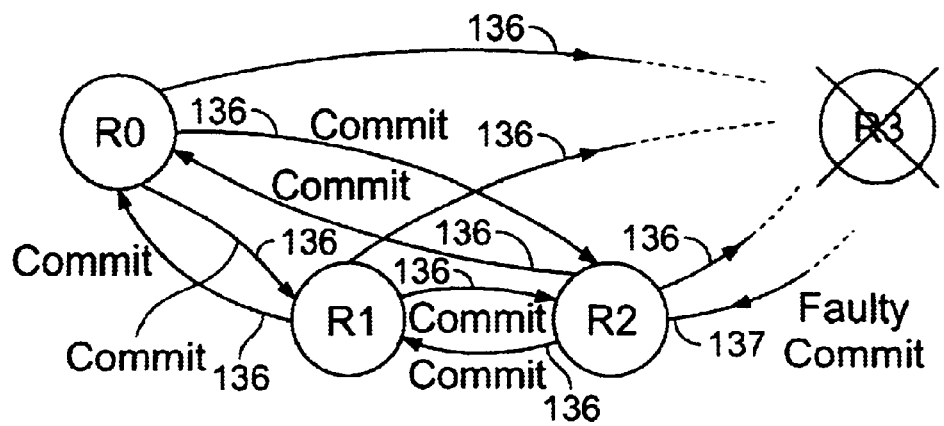

Referring to FIG. 5C, replicas R0, R1, and R2 110 enter the Commit phase and multicast Commit messages 136 to the other replicas. Note that they multicast the Commit message 136 to replica R3 110 even though they have not received Prepare messages from it. Again, it is possible for a replica to received a faulty Commit message 137, but it will recognize the Commit as not matching the sequence or digest or not being properly authenticated.

Note that if for some reason the original Pre-prepare message 132 from primary R0 110 to backup R3 110 were lost as illustrated in FIG. 5A but R3 were not actually faulty, then if replica R3 110 subsequently receives Prepare messages 134 from replicas R1 and R2, it would not enter the Commit phase because it can only determine that 2 replicas and not the required 2f+1 have entered the Prepare phase.

Figure 5D:
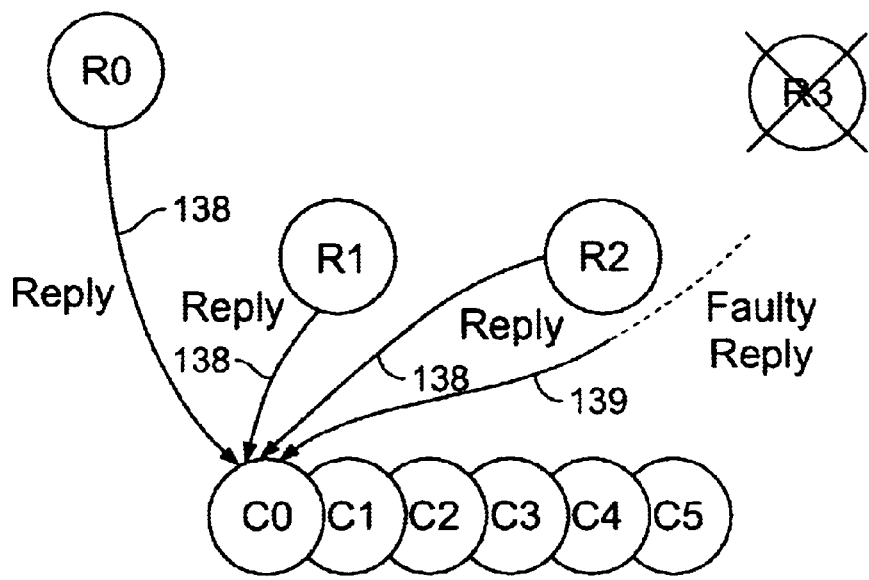

Finally, referring to FIG. 5D, after replicas R0–R2 are committed and have executed the request, they send Reply messages 138 to client C0 120. In this example, C0 waits for f+1=2 consistent replies. In the case that faulty replica R3 110 sends a faulty reply 139, C0 must determine which replies are correct and which are faulty. As illustrated in FIG. 6, faulty reply 139 arrives at C0 first, followed by a correct reply 138 from replica R0. Since the replies do not match, client C0 120 must wait for more replies. After correct reply 138 arrives from replica R2, client C0 determines which is the correct reply (those from R0 and R2, which match each other) and discards the faulty reply from R3.

Figure 7A:
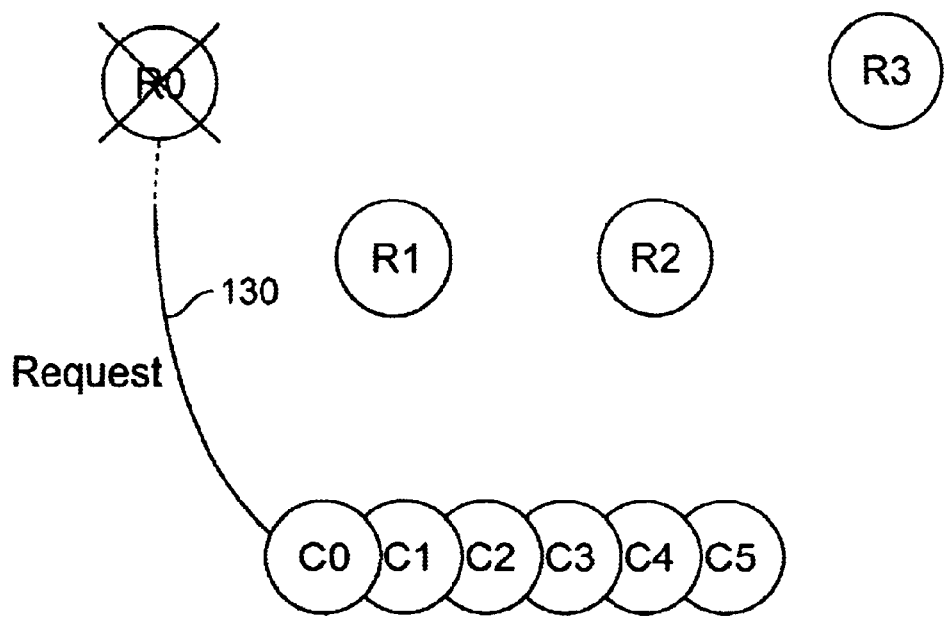
FIGS. 7A–D are diagrams that illustrates operation of the fault-tolerant system when a primary replica is faulty.
Figure 7B:
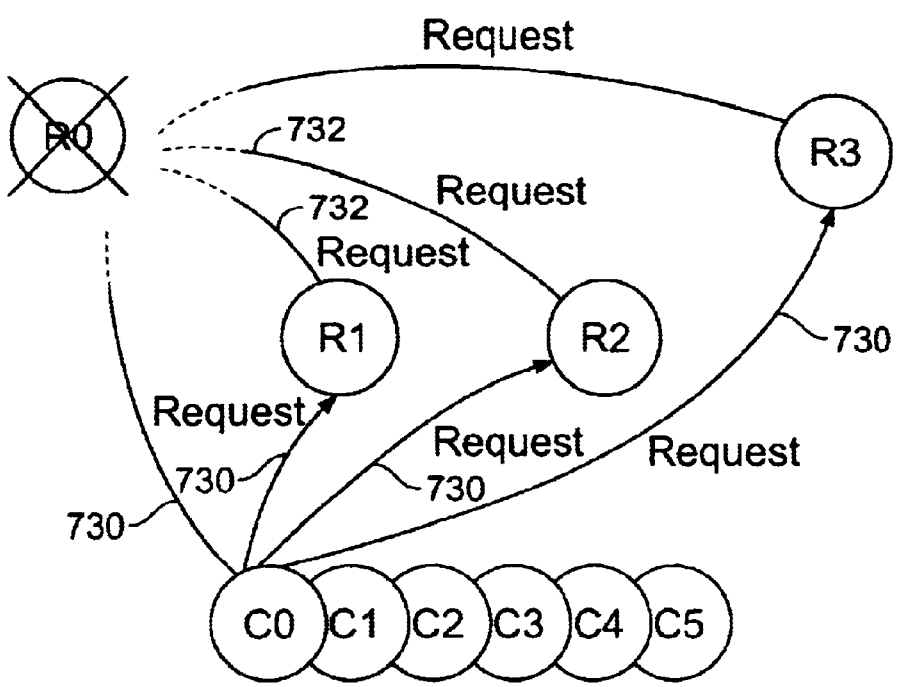

In the situation in which the primary replica 110 in a view fails, a client 120 that has sent a request message 130 eventually times out, for instance after waiting a fixed timeout period and not receiving any replies to the request. Referring to FIGS. 7A–D, client 120 multicasts a request message 730 to all the replicas after it has not received a reply within a timeout period. Referring to FIG. 7B, each replica 110 that received request 730 forwards the request in a message 732 to primary replica R0 110 for the current view. If only communication between client 120 and primary replica R0 110 had been disrupted, then the primary replica would then continue as if it has received the request directly from the client, and it would ignore the other requests with the same timestamp and client id as duplicated. In the example illustrated in FIGS. 7A–D, however, primary replica R0 110 has failed and therefore does not process the forwarded requests 732.

Figure 7C:
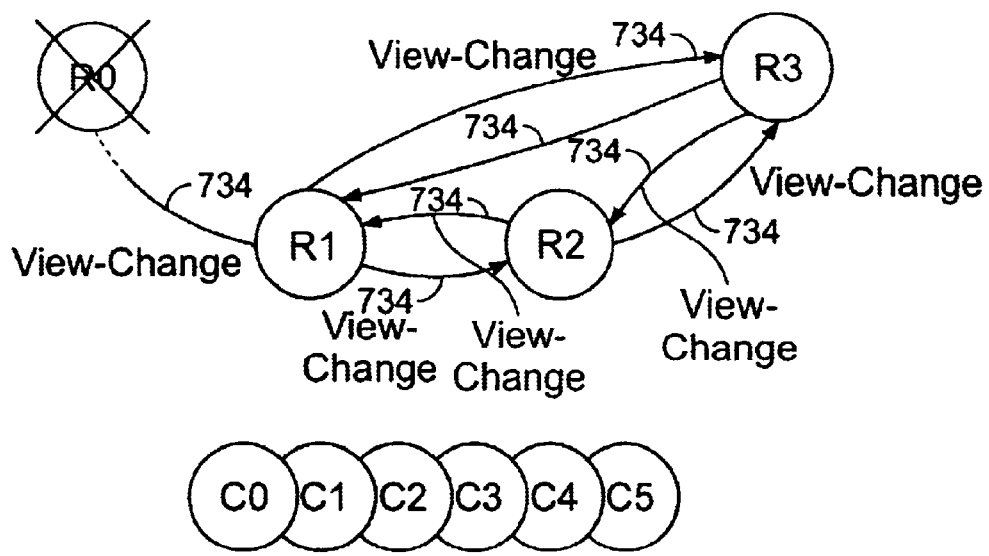

Referring to FIG. 7C, after forwarding message 732 with the client's request to primary replica R0 110, the backup replicas expect to receive Pre-prepare messages 132 (see FIG. 2B) from the primary replica. After a timeout period during which they do not receive any communication from the primary replica, each of the backup replicas R1–R3 110 changes its view. As a result of the view change, the view index, v, will be incremented at each of the replicas, and a new primary replica will be chosen using v+1 (mod|R|), or in this case, v will change from 0 to 1 and R1 will become the new primary replica.

Referring to FIGS. 7C–D and FIGS. 8A–B, which show a flowchart for the view-change operation, when a backup replica Rj times out (step 810), it enters view v+1 and it multicasts a <VIEW-CHANGE,v+1,ls$_j$,C,P,Q,i> message 734 to all replicas (step 812). The argument ls$_j$ is the sequence number of the latest stable checkpoint known to Rj and C is a set of pairs with the sequence number and digest of the service state at that sequence number of each checkpoint stored at replica Rj. Checkpoints are used to make garbage collection of messages from the log wok. They allow replicas to fetch state when messages have been discarded. This fetching of state occurs both when replicas get behind and during recovery, as is described more fully below. P and Q are sets containing an element for every request that is prepared or pre-prepared, respectively, at Rj. In this simple case, we first describe a situation in which no backup replica has any pre-prepared or prepared request pending and defer the discussion related to processing pending requests and synchronizing the states at each replica.

Figure 7D:
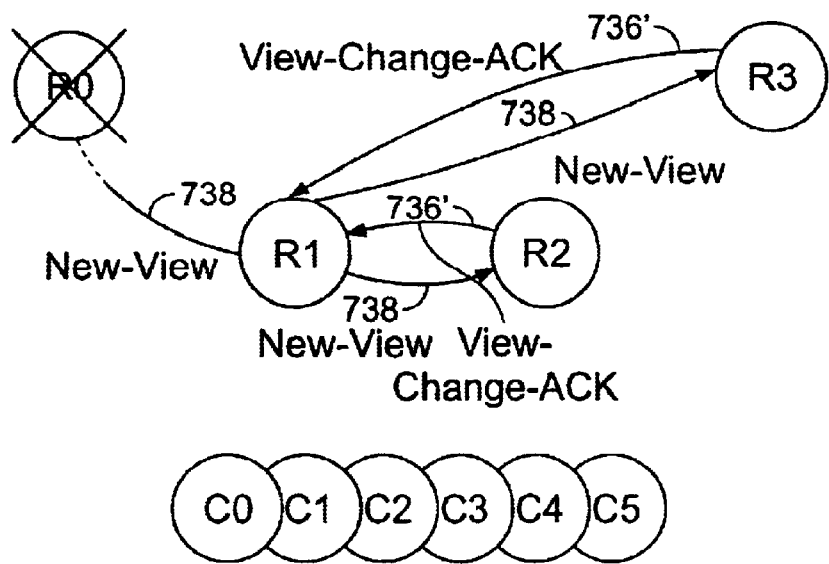

Referring to FIG. 7D, each backup replica Rj (that is, a backup in view v+1) that receives a View-change message 734 for view v+1 (step 820) sends a <VIEW-CHANGE-ACK,v+1,i,j,d> message 736 for that received View-change message to primary replica Rp (step 822). In this example v+1=1 and the new primary replica is R1. In View-change-ack message 736, i is the identifier of the sending-replica, d is the digest of the View-change message 734 being acknowledged, and j is the replica that sent that view-change message. As is discussed below in relation to authentication of messages, these acknowledgements are useful in preventing view changes from being based on unauthorized messages.

When new primary replica Rp 110 (here R1) receives View-change messages 734 (step 830) and View-change-ack messages 736 (step 832), it stores View-change messages in a set S when certain conditions are satisfied. If it has received 2f–1 View-change-acks for Rj's view-change from other replicas (step 834), it adds a View-change message 734 for replica Rj to S (step 836). The new primary replica Rp 110 waits to determine that 2f+1 backup replicas have initiated a view change for view v+1 by multicasting View-change messages 734.

After primary replica Rp 110 has received 2f–1 View-change-ack messages 736 related to Rj's View-change message 734, a total of 2f+1 replicas, Rj, new primary Rp, and the 2f–1 senders of the View-change-ack messages 736, all agree that Rj sent the View-change message. With at most f failures or compromised replicas, new primary replica Rp can prove to the other replicas that Rj sent the view change message, without requiring a message signed using Rj's public key.

If after adding a replica to set S (step 836) primary Rp 110 does not yet have 2f+1 View-change messages 734 in its set S (step 838), including its own View-change message for which it does not need to received View-change-ack messages, then it continues to wait for additional View-change and View-change-ack messages 736.

If the view change message added to S is the 2f+1$^{st}$ or later view change message to be added, then primary replica Rp 110 matches pending request sequence numbers with particular request digests and states (pre-prepared, or prepared) (step 840). This matching is performed by selecting particular requests for which. sufficient numbers of other replicas agree according to information they multicasted in their View-change messages 734. This procedure is described in detail below.

The new primary replica Rp 110 selects requests for all sequence numbers that were assigned to requests that executed in previous views (step 842), then the new primary replica Rp 110 multicasts a New-View message 738 (step 844) to the backup replicas.

Figure 8A:
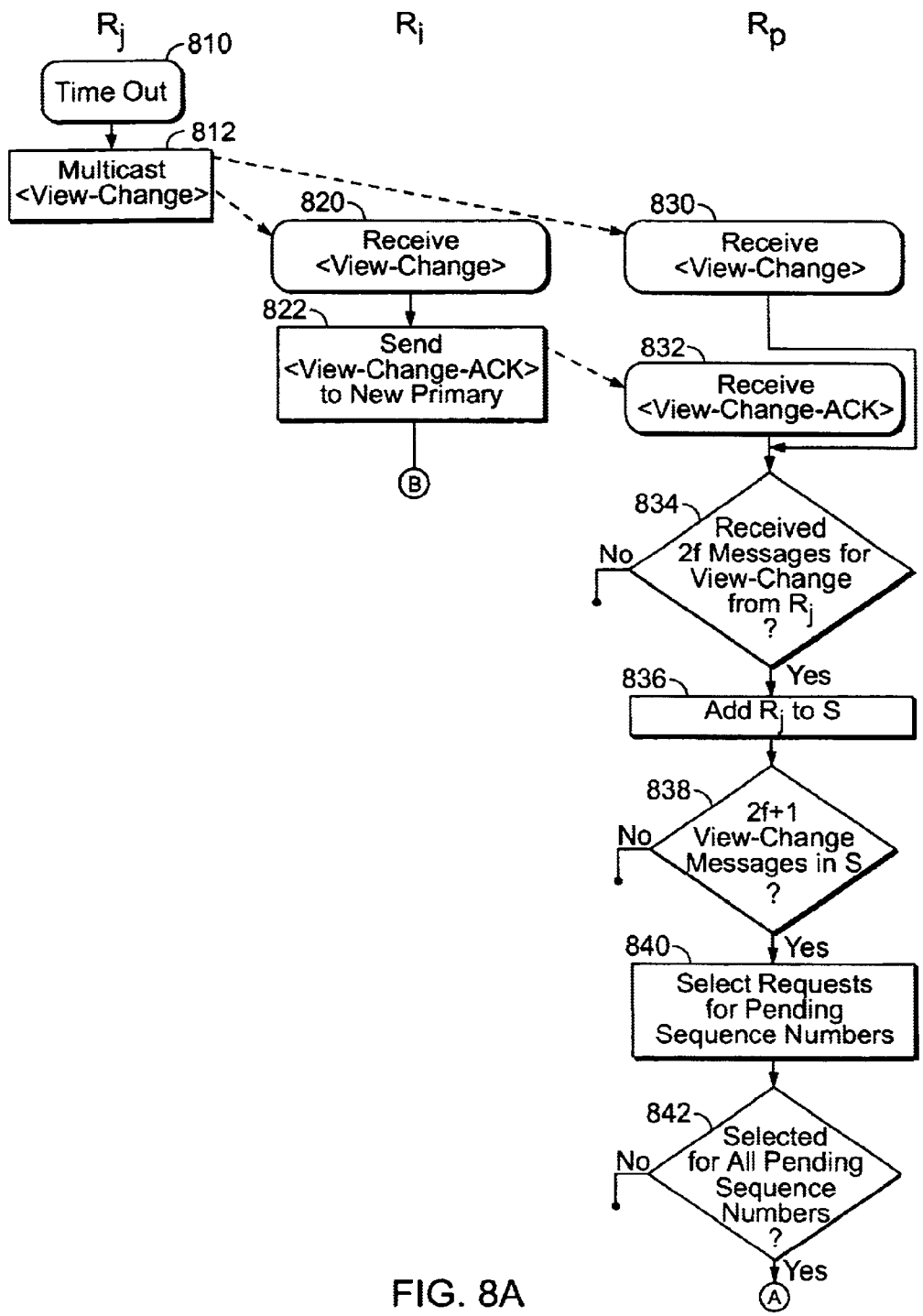
FIGS. 8A–B are a flowchart for a view change procedure.
Figure 8B:
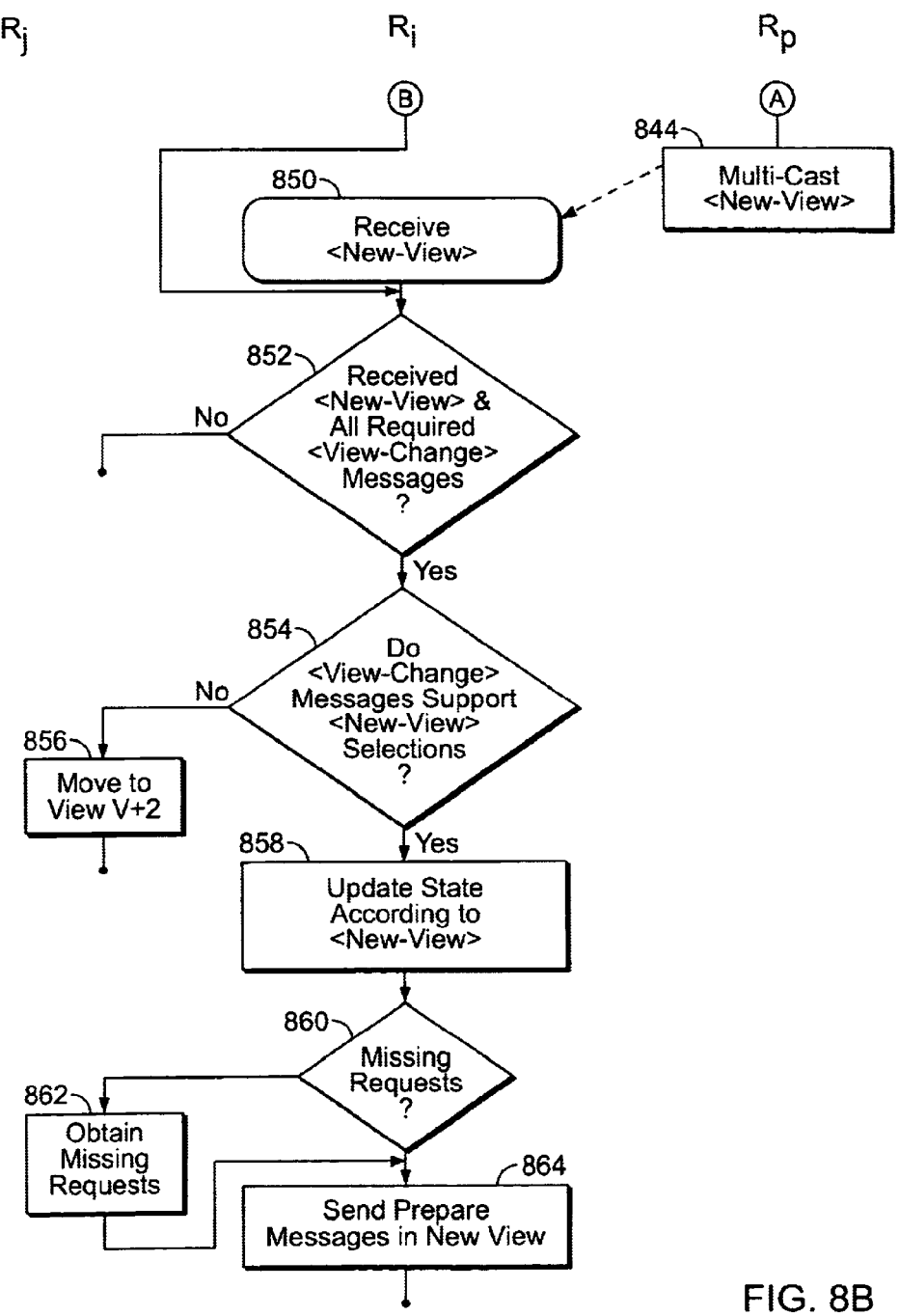

Referring to FIG. 8B, after backup replica Ri 110 receives a New-View message 738 (step 850), and after it has processes each View-Change 734 message, it determines whether it has received a required set of View-Change messages 734 that match the New-View message (step 852). The details of this matching are described in detail below. In general, backup replica Ri 110 must receive a View-Change corresponding to each one that primary replica Rp 110 has added to its set S and these View-Change messages must be consistent with the primary's selection of requests for each of the sequence numbers (see steps 836, 840).

At this point, backup replica Ri 110 updates its protocol state according to the information it received in the New-View message from primary Rp (step 858). If it is missing any requests or state (step 860), it requests the missing information from the other replicas (step 862) in a procedure that is described in detail below. Finally, backup replica Ri sends prepare messages in the new view for the pre-prepared messages that were chosen by the new primary replica (step 864), and resumes the normal protocol.

If for some reason the New-View message received from primary replica Rp does not match the View-Change messages (step 854), the backup replica Ri increments its view yet again (to v+2) and initiates another view change (step 856).

Before continuing the discussion related to view changes establishing consistent state among replicas, particularly when each replica may have a different set of pre-prepared and prepared requests, we turn to authentication of messages between replicas and between clients and replicas. One approach to authentication is use of public key cryptography by which any sender of a message signs that message with its private key. The notation <>$\sigma_i$ indicates that the message <> is signed using the replica's private key. A preferred embodiment, which avoids the large number of digital signature operations that is required by that approach, uses a message authenticator code (MAC) approach rather than a public key approach. Note that a public key approach would also have to deal with "freshness" of signatures when then public and private key pair are updated.

In the preferred embodiment, each pair of replicas 110, Ri and Rj, uses a pair of session keys: $k_{ij}$ is used to authenticate messages sent from Ri to Rj, and $k_{j,i}$ is used for messages sent from Rj to Ri. Each replica 110 has in addition a single session key for each active client 120. Some messages in the protocol contain a single MAC (in this embodiment using a construction called "UMAC"); we denote such a message as <>$\mu_{ij}$, where Ri is the sender, Rj is the receiver, and the MAC is computed using $k_{ij}$. Other messages contain "authenticators"; we denote such a message as <>$\alpha_i$, where Ri is the sender. An authenticator is a vector of MACs, one per replica Rj (j≠i), where the MAC in entry j is computed using $k_{ij}$. The receiver of a message verifies its authenticity by checking the MAC corresponding to the receiver in the authenticator.

In general, messages directed to a single replica 110 include a MAC while multicast messages include an authenticator with a vector of MACs.

Replicas 110 and clients 120 refresh the session keys used to send messages to them by sending New-key messages periodically, for example, every minute. The same mechanism is used to establish initial session keys. A replica Ri 110 sends a message having the form <New-key,i,<$k_{j,i}$>$\epsilon_j$,t>$\sigma_i$. Each replica 110 is assumed to hold a private key known only to it, preferably in a secure coprocessor (see FIG. 9 discussed below) that is resistant to attack. The notation <>$\sigma_i$ indicates that the message is signed using the replica's private key, preferably by the secure coprocessor which holds the private key. The notation <$k_{j,i}$>$\epsilon_j$ is used to represent the key $k_{j,i}$ encrypted with the recipient Rj's public key so that only Rj can decrypt it using its private key. The New-key message from replica Ri includes new keys $k_{j,i}$ for all the other replicas. The variable t in the message is a timestamp or counter, preferably added in the secure coprocessor, which is used to prevent replay attacks. Replicas use timestamp t to detect spurious new-key messages: t must be larger than the timestamp of the last New-key message received from Ri. When a replica or client sends a New-key message, it rejects any messages it receives in the future that are authenticated with old keys.

Each replica shares a single secret key with each client; this key is used for communication in both directions. The client refreshes the key periodically, using the New-key message. If a client neglects to do this within some system-defined period, a replica discards its current key for that client, which forces the client to refresh the key.

Figure 9:
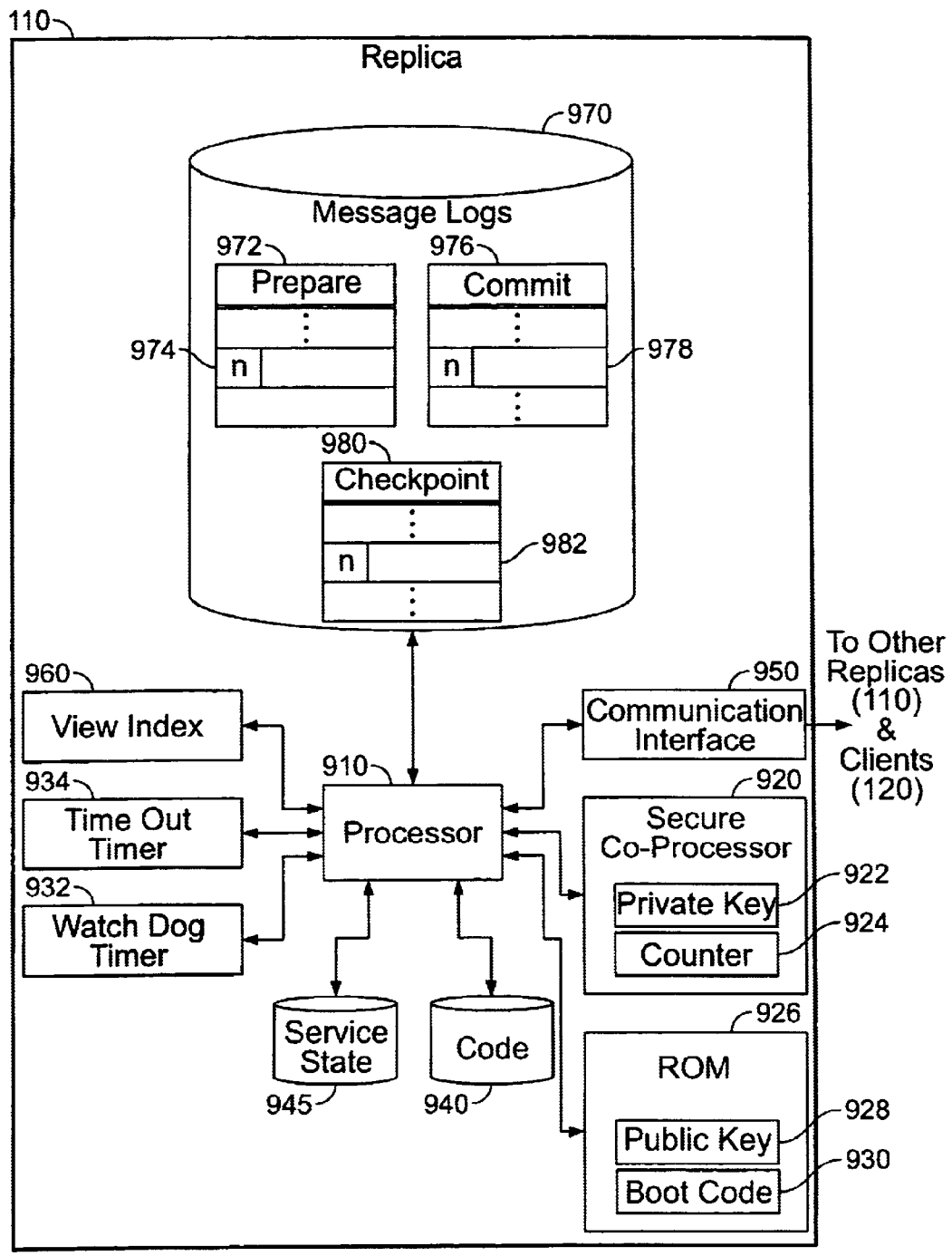
FIG. 9 is a block diagram of a replica.

Referring to FIG. 9, a replica 110 includes several components. In this embodiment in which each replica is implemented on a different computer on a data network, the replica includes a general processor 910, which executes code 940 to implement the protocols described above and to implement the service operations and to maintain the service state 945. A communication interface 950 provides a communication path between processor 910 and other replicas 110 and clients 120. As introduced above, replica 110 preferably includes a secure co-processor 920, which includes a private key 922 and a counter 924, and that is protected against attack. Also, replica 110 preferably includes a read-only memory (ROM) 926 that includes protected boot code 930 as well as its public key 928 and the public keys of the other replicas (or a public key of an authority that can provide certified copies of those public keys). Using ROM 926, at startup replica 110 uses boot code 930 to start the protocols described above. Optionally, a digest of code 940 can be stored in ROM and boot code 930 validates the integrity of the code by checking a newly computed digest of the code prior to executing it. This allows a replica to prevent execution of compromised code at startup and, as discussed below, after periodic recoveries of replicas. Also as discussed below, a watchdog timer 932 initiates proactive recovery of the replica in a manner that cannot be avoided by a compromise of the running code or stored data on a replica, for example, by asserting a non-maskable interrupt (NMI) on processor 910. Replica 110 also initiates a view changes if it does not receive messages from the primary replica in time. For instance, the replica uses a cycle counter, which cannot be compromised by an attacker, to count this time. Alternatively, a separate protected timer can be used for this purpose.

As part of the execution of the replication protocol described above, replica 110 maintains a current view index, v, 960, as well as message logs 970. Message logs 970 include a prepare table 972, which includes a set of prepare records 974 each of which is associated with a particular request sequence number, a commit table 976, which includes a set of commit records 978, and a checkpoint table 980, which includes a set of checkpoint records 982.

Figure 10:
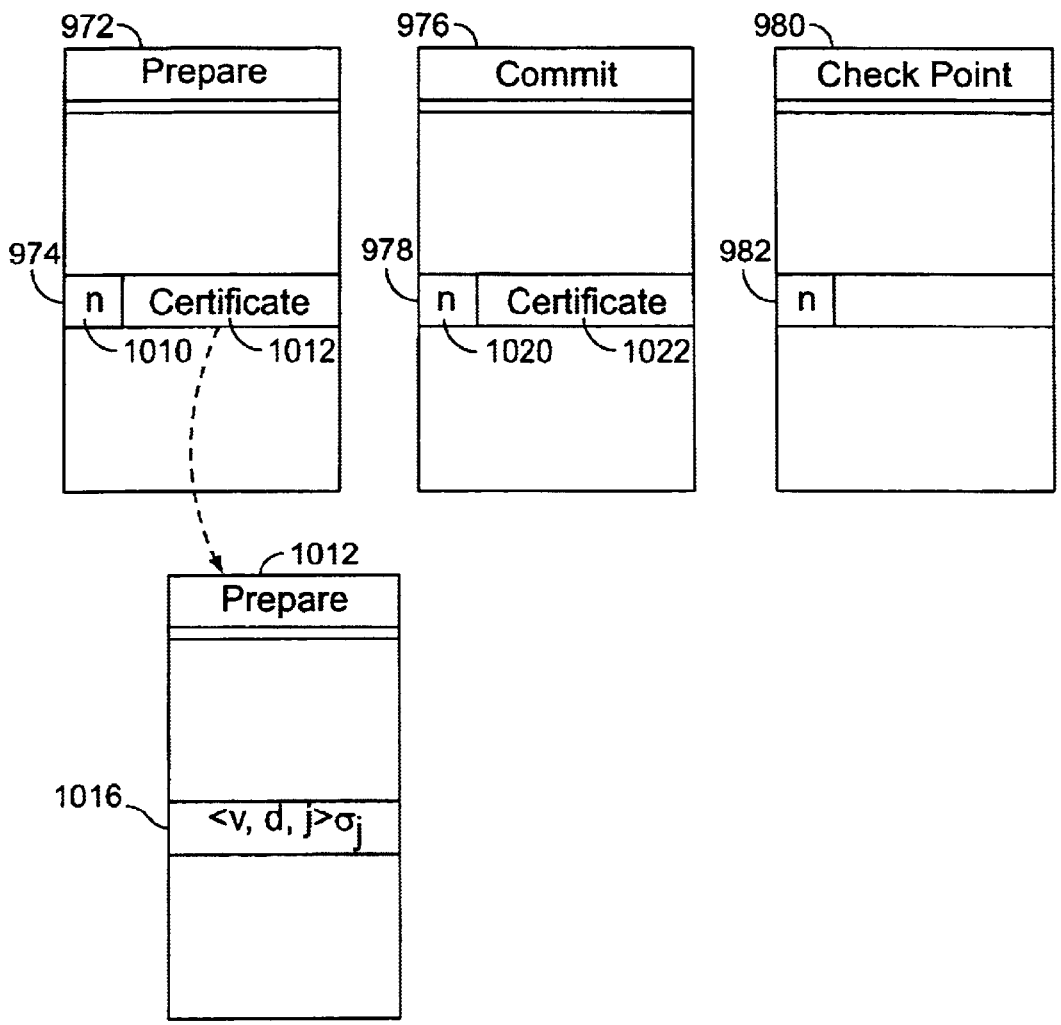
FIG. 10 illustrates tables in a message log in a replica.

Referring to FIG. 10, prepare table 972 includes a number of prepare records 974. Each prepare record 974 includes a request sequence number, n, 1010. A certificate is a set of messages certifying the same "statement" is correct and coming from different replicas. An example of a statement is: "the result value of the operation o requested by client c is r."

The size of the set of messages in a "complete" certificate is either f+1 or 2f+1, depending on the type of statement and step being taken. The correctness of the system is based on a certificate not containing more than f messages sent by faulty replicas. Intuitively, a certificate of size f+1 is sufficient to prove that the statement is correct because it contains at least one message from a non-faulty replica. A certificate of size 2f+1 ensures that it will also be possible to convince other replicas of the validity of the statement at a future time because at least f+1 non-faulty of the 2f+1 replicas remember the statements they certified.

Refreshing of session keys is taken into account when assembling messages in a certificate. A replica only accepts messages that are equally "fresh." In one embodiment, "fresh", mean that the messages in a certificate were all sent using the latest session key that the replica provided to the sender in a New-key message. This prevents an attack in which messages are sent using old keys over a long period of time. For example, in such an embodiment, a replica may periodically start a key "epoch" and send New-key messages to all other replicas at the beginning of the epoch and refuse to accept messages which use session keys from any previous epoch.

A preferred embodiment addresses refreshing of session keys in assembling a certificate in a somewhat more efficient manner. In this embodiment, a non-faulty replica is guaranteed to never accept certificates with more than f "bad" messages. When a replica changes a session key, it discards any not yet completed certificate messages.

In operation, a replica 110 uses prepare table 972 in the Pre-prepare and Prepare phases for requests. When a backup replica 110 receives a Pre-Prepare message 132 from primary replica 110, it, creates a prepare record 974 for the request and begins assembling a certificate 1012 for the request, initially only including the pre-prepare message it received. As it receives Prepare messages 134 for the request, it adds those messages to certificate 1012 until it has 2f+1 equally fresh messages in the certificate. This completes step 450 introduced above in the flowchart shown in FIG. 4. The replica then multicasts the Commit message 136 (step 460) and creates a commit record 978 in commit table 976 for the request. Commit record 978 includes a certificate 1022 that initially includes only the Commit message the replica multicast. As the replica receives Commit messages, it adds them to certificate 1022. When certificate 1022 holds 2f+1 equally fresh Commit messages from other replicas, the certificate is complete and the request is ready to execute (in order).

A replicas discards entries from its message logs 970 once that replica knows that the request has been executed by at least f+1 non-faulty replicas 110. f+1 replicas are needed to ensure that the execution of that request will be known in a view change. In one embodiment, replicas can notify one another whenever they execute a request. In a preferred embodiment, which involves less communication, replicas only inform one another after larger sets of requests have been executed. In particular, in this embodiment, replicas communicate only when a request with a sequence number divisible by some constant K (e.g., K=100) is executed. We will refer to the states produced by the execution of these requests as "checkpoints" and we will say that a checkpoint known to have been reached by f+1 non-faulty replicas is a "stable checkpoint."

A replica maintains several logical copies of the service state: the last stable checkpoint, zero or more checkpoints that are not stable, and a current state. Optionally, in order to reduce the space overhead to store the copies of the state other than the current state, differences between the current state and the copies of the state are recorded using a copy-on-write technique.

When replica Ri produces a checkpoint, it multicasts a <CHECKPOINT,n,d,i> message to the other replicas, where n is the sequence number of the last request whose execution is reflected in the state and d is the digest of the service state. The digest can be computed efficiently using an incremental cryptography approach. When replica Ri produces a new checkpoint or receives a new Checkpoint message from another replica, it creates a checkpoint record 982 in checkpoint table 980 in its message logs 970. The replica waits until it has a certificate containing 2f+1 valid checkpoint messages for sequence number n with the same digest d, all equally fresh and sent by different replicas (including possibly its own such message). At this point the replica knows that the checkpoint is stable and the replica discards all entries in its message logs 970 with sequence numbers less than or equal to n. It also discards all earlier checkpoints.

A replica uses the checkpoint protocol to advance a low and a high water mark, which together limit the range of sequence numbers for messages it will accept. The low-water mark h is equal to the sequence number of the last stable checkpoint. The high water mark is $H=h+\Delta S$, where $\Delta S=cK$ for c a small integer constant (e.g., c=2, $\Delta S=cK=200$) that is big enough so that replicas do not stall waiting for a checkpoint to become stable.

Referring back to FIG. 8A, the procedure by which a replica Rj multicasts View-Change message 734 (step 812), primary replica Rp selects requests for each sequence number (step 840), and Rp transmits the selected requests to the backup replicas (step 844), involves a number of computations. First, replica Rj 110 multicasts <VIEW-CHANGE,v+1,$ls_j$,C,P,Q,i> message 734 to all replicas (step 812). The argument $ls_j$ is the sequence number of the latest stable checkpoint known to Rj and C is a set of pairs with the sequence number and digest of the service state at that sequence number of each checkpoint stored at replica Rj. P and Q, which are sets containing an element for every request that is prepared or pre-prepared, respectively, are computed by Rj as follows.

The view change algorithm works even when more than one view change occurs before the system is able to continue normal operation. For this reason, replicas remember what happened in earlier views. This information is maintained in two sets, the PSet and the QSet. Like a replica's message logs, these sets contain information only for messages with numbers above the last stable checkpoint and below that checkpoint plus $\Delta S$. Therefore only limited storage is required. A replica also stores the messages corresponding to the entries in these sets. When the system is running normally, these sets are typically empty.

The PSet at replica Rj stores information about messages that have prepared at Rj in the past, that is, messages for which Rj sent a commit message in an earlier view. Its entries are tuples e=<n,d,v> meaning that a request with digest d prepared at Rj with sequence number n in view v and no request with a different digest prepared at Rj in a view greater than v. The QSet stores information about messages that have pre-prepared at Rj. Its entries are tuples e=<n,d,v,u> meaning that v is the latest view in which a request pre-prepared with sequence number n and digest d at Rj; no request with a different digest pre-prepared at Rj in a view greater than v; and u is the latest view for which a request with digest different from d pre-prepared at Rj. The view-change protocol ensures that no request prepared globally with sequence number n in any view $v' \leq u$.

For all sequence numbers n such that $ls_j < n \leq ls_j + \Delta S$, if Rj has prepared or committed a message with sequence number n with digest d it adds <n,d,v> to P otherwise if there is an entry e for sequence number n in PSet it add <n, e.d, e.v> to P.

For all sequence numbers n such that $ls_j < n \leq ls_j + \Delta S$, if Rj has pre-prepared, prepared, or committed a message with sequence number n with digest d, if there is an entry e for sequence number n in QSet then Rj either adds <n,d,v, e.u> to Q if the digests match, e.d=d or else adds <n,d,v,e.v> to Q if the digests do not match., If there is no entry for sequence number n in QSet, then Rj adds adds <n,d,v,-1> to Q. If Rj has not pre-prepared, prepared, or committed a message with sequence number n then if there is an entry e for sequence number n in QSet then Rj adds <n,e.d,e.v,e.u> to Q.

After Rj sends the View-change message, Rj stores P in PSet an Q in QSet.

Referring to FIG. 8A, after new primary Rp has stored 2f+1 or more view change message in set S (steps 836, 838), it selects requests for each sequence number (step 840) as follows. Primary Rp needs to decide for each sequence number above the most recent stable checkpoint whether a request with that number might have committed in a previous view, in which case it propagates a pre-prepare for it. If a request with that sequence number was in progress but had not yet committed, primary Rp either propagates a pre-prepare for it, or it propagate a special "null" request that goes through the protocol as a regular request but whose execution is a no-op. The decision procedure used by primary Rp is outlined below:

1. Let cp be a checkpoint sequence number, which is initially set to 0.

2. if (a) there is an entry in S for some replica Ri that proposes a stable checkpoint number n with digest d such that n>cp, (b) 2f other entries in S propose stable checkpoint numbers that are less than or equal to n, and (c) f other entries propose checkpoint sequence number n with the same digest d, then Rp updates cp to be n.

3. let $N=cp+\Delta S$ 4. for every n such that $cp < n \leq N$

A. if there exists an entry m in S such that the set P received from Rm in the View-change message contains <n,d,v> that verifies (i) at least 2f other entries in S either have ls<n and no entry for n in their P, or have an entry <n,v',d'> in their P with either v'<v or both v'=v and d'=d, (ii) at least f other entries in S have <n,d,v',u'>in their Q with both $v' \geq v$ and d'=d or with $u \geq v$, and (iii) primary Rp itself has the request for sequence number n with digest d, then primary Rp selects a pre-prepare for d for message number n.

B. otherwise, if there exists an entry m in S such that m.ls <n and there is no entry for n in Rm's P and at least 2f other entries in S with ls<n also have no entry for n in their P, then primary Rp selects null for message number n.

As introduced above, at each replica 110 watchdog timer 932 (FIG. 9) periodically initiate a proactive recovery of that replica. For example, the timer proactively recovers the replica every five minutes, or at intervals that are substantially shorter than the lifetime of the system. A recovery monitor (software stored in ROM 926 or code 940) checkpoints the state of the service and the replication protocol to disk, computes a digest of all the replica's code (including the operating system, daemons, and configuration files), compares it with a prestored digest (which is kept in ROM 926), and reloads the code if the two do not match. In an alternative embodiment, code 940 is stored on a read-only medium thereby ensuring that it has not been compromised. For example, several modern disks can be write-protected by physically closing a jumper switch.

The duration of the window of vulnerability, $T_v$, of the system depends in part on the duration between proactive recoveries of the replicas. In particular, one term in the duration of the window of vulnerability is the maximum time between a fault at a replica and the time it is fully recovered, which we term $T_r$. The window must be somewhat larger than $T_r$ to deal with the key refreshment approach in which session keys are refreshed at least every $T_k$. To account for replicas accepting certificates with messages generated within an interval of at most 2 $T_{k1}$, the window of vulnerability is set to $T_v = 2T_k + T_r$.

The recovery monitor reboots the replica and restarts the service in a recovery mode from the checkpointed state. This ensures that the replica's code is restored to a correct state, thereby preventing an attacker from leaving behind a Trojan horse that persists through the rebooting process.

At this point after rebooting the replica's code is good but its state may be bad. The rest of recovery determines whether the state is bad and restores the state if necessary. In particular, by the time recovery is complete (1) an intruder will be unable to impersonate replica Ri to send bad messages to other replicas; and (2) replica Ri will not act on bad information in its state. Note that replica can continue to process messages while recovering.

Recovery is done so that a replica that was not faulty remains fault-free. The replica retains its state and uses that state to process requests even while it is recovering. This ensures both safety and liveness if the recovering replica is non-faulty (which is likely to be the common case) since otherwise the recovering replica could become the $f+1^{st}$ fault.

Figure 12:
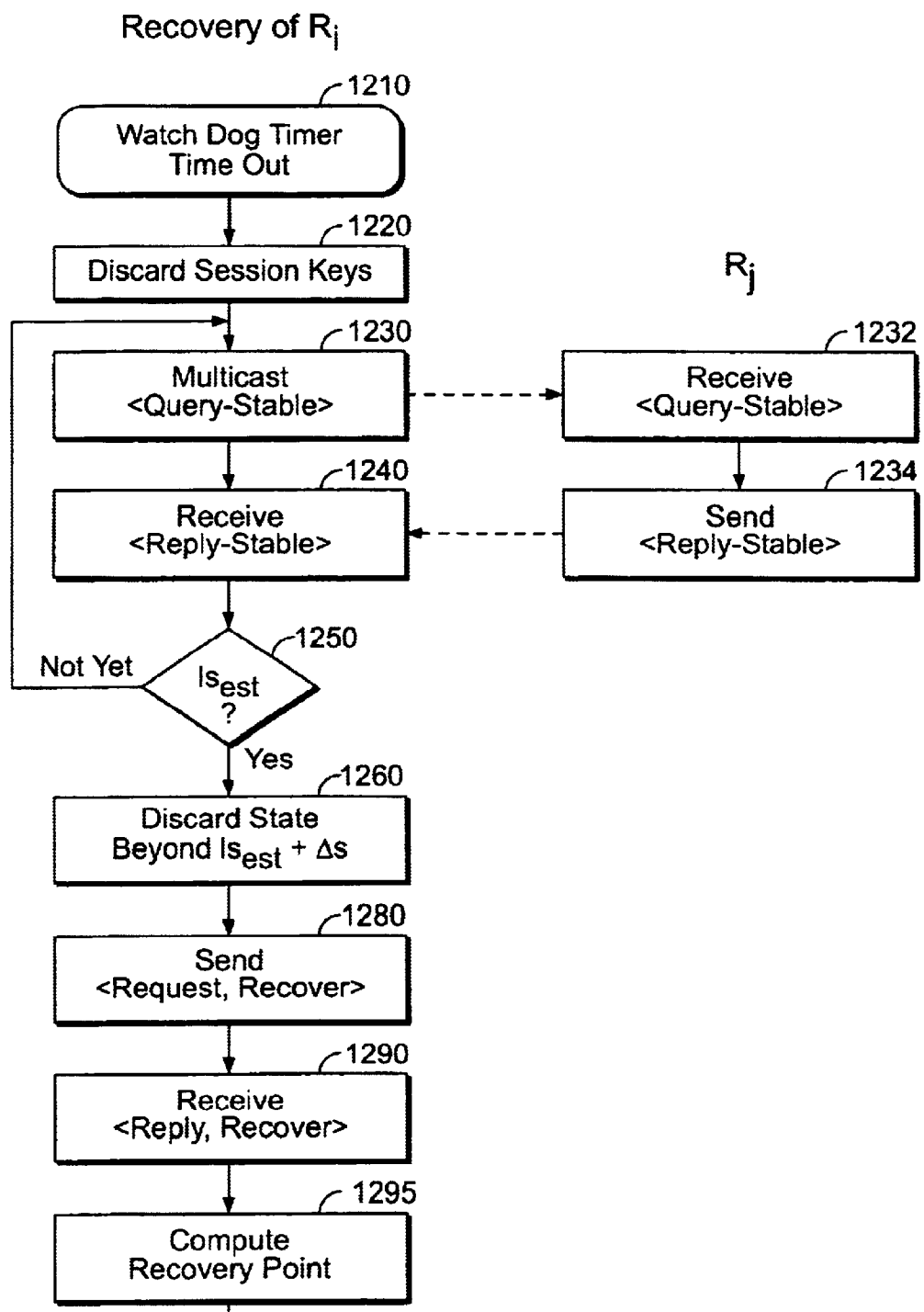
FIG. 12 is a flowchart for a recovery procedure.

Referring to the flowchart in FIG. 12, after watchdog timer 932 times out (step 1210) recovering replica Ri 110 begins recover by discarding its session keys for clients 120, and the session keys used by other replicas 110 to authenticate messages sent to it and it multicasts a New-key message to all the replicas (step 1220).

Figure 11A:
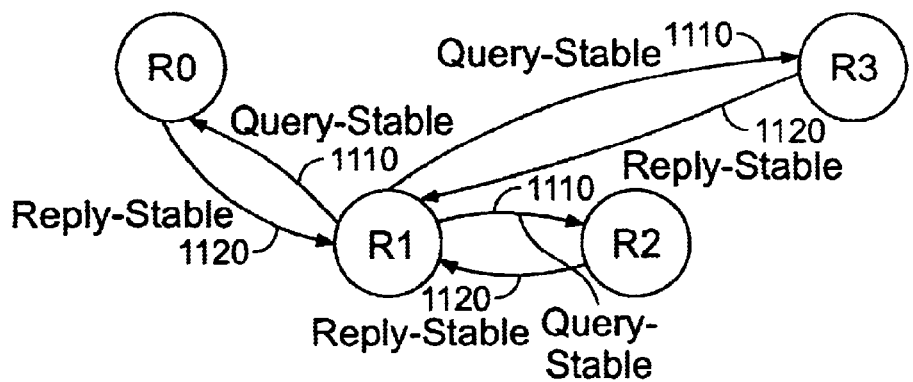
FIGS. 11A–B are diagrams that illustrate a recovery procedure.

Next, begins a procedure by which Ri computes $ls_{est}$, which is an estimate of $ls_{max}$, the maximum stable checkpoint sequence number at any non-faulty replica. Replica Ri estimates $ls_{max}$ as follows. Referring to FIG. 11A, Ri multicasts a <QUERY-STABLE,i,r> message 1110 to all the other replicas (step 1230), where r is a fresh random "nonce" (i.e., a number used once). When another replica Rj receives this message (step 1232) it replies <REPLY-STABLE,$lc_j$,$lp_j$,i,r> (step 1234), where $lc_j$ and $lp_j$ are the sequence numbers of the last checkpoint at Rj and the last request prepared by Rj, respectively. Replica Ri keeps retransmitting the Query-stable message and processing Reply-stable replies until it has computed $ls_{est}$. For each replica Rj it keeps the minimum value of $lc_j$ and the maximum value of $lp_j$ it received in replies from that replica. In computing $ls_{est}$ Ri also makes use of its own values of $lc_i$ and $lp_i$. During this procedure Ri does not handle any other protocol messages except New-key, Query-stable, and status messages, which are discussed below.

The recovering replica Ri uses the Query-stable replies to compute $ls_{est} = ls_j$ for some j (if any) to satisfy:

1) at least 2 f replicas Rm (m≠j) replied with $ls_m \leq ls_j$, and
2) at least f replicas Rn (n≠j) replied with $lp_n \geq ls_j$ If Ri cannot find $ls_{est}$ to satisfy these conditions (step 1250) it continues to wait for more Reply-stable messages 1120.

After computing $ls_{est}$, replica Ri discards its entire protocol state if it has any messages with sequence numbers greater than $ls_{est} + \Delta S$ (step 1260).

Figure 11B:
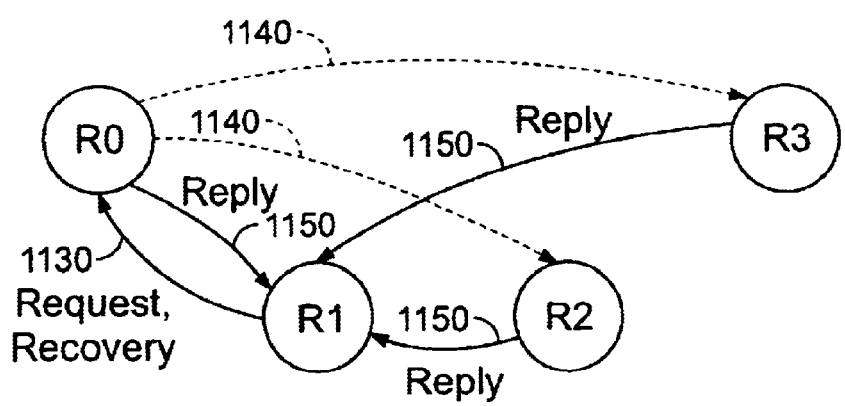

Then it sends a Recovery request message 1130 of the form <REQUEST,<RECOVERY,$ls_{est}$>,t,i> to the primary replica using the same procedure that a client would send a Request to the system (step 1280). As illustrated in FIG. 11B with dashed lines 1140, the request is propagated to the other replicas using the three-phase protocol described above. The request is assigned a sequence number, $n_i$, in the same manner as other requests. The replicas act on the recovery request according to this sequence number, in the same manner as waiting for a client's request to reach its turn to be executed.

When a replica Rj accepts the recovery request, it sends its own New-key message to Ri. This avoids Rj from accepting counterfeit messages sent by an attacker that is impersonating the recovering replica Ri. When replica $R_j$ executes the recovery request, it sends a Reply recovery message 1150 to $R_i$. The recovery reply includes $n_i$, the sequence number at which it was executed. Ri uses the same protocol as the client to collect the correct reply to its recovery request but waits for 2f+1 replies that agree rather than f+1 replies (step 1290). Then it computes its "recovery point", $H = \max_j (ls_{est}, cp(n_i)) + \Delta S$, where $cp(n_i)$ is greatest multiple of K (a possible checkpoint) not greater than $n_i$ (step 1295). Recovering replica Ri also computes a valid view index; it retains its current view if there are f+1 replies for views greater than or equal to it, else it changes to the median of the views in the replies. Ri continues to participate in the protocol as if it were not recovering except that it will not send any messages above H until it has the correct stable checkpoint for that sequence number.

While Ri is recovering, it determines whether its state is correct, and if not it discards the bad parts and fetches good parts from other replicas (by using the state transfer mechanism discussed below).

Replica Ri is "recovered" when the checkpoint-with sequence number H is stable. This ensures that any state other replicas relied on Ri to have is actually held by f+1 non-faulty replicas. Therefore if some other replica fails now, we can be sure the state of the system will not be lost. This is true because the estimation procedure run at the beginning of recovery ensures that while recovering Ri never sends bad messages for sequence numbers above the recovery point. Furthermore, replicas only accept messages above the recovery point if their state reflects the execution of the recovery request; by then they will have sent the New-key messages, and therefore will not be fooled by an intruder impersonating Ri.

If clients are sending requests to the system during recovery, they could be delayed since the system needs to reach request H before recovery occurs. This is addressed as follows. While a recovery is occurring, the primary speed things up by sending pre-prepare messages for special "null" requests. A null request goes through the protocol like other requests, but its execution is a no-op.

The approach described above has the property that any replica knows that Ri has completed its recovery when checkpoint H is stable. This allows replicas to estimate the duration of Ri's recovery, which is useful to detect denial-of-service attacks that slow down recovery with low false positives, and to securely adjust the watchdog timeout.

In the procedures described above, a replica may determine that it is missing a message or is unable to reconstruct the service state at a particular checkpoint. The system uses mechanisms for message retransmission and state transfer. The state transfer mechanism is used to bring replicas up to date when some of the messages they are missing were garbage collected.

The system uses a receiver-based recovery mechanism in which a replica Ri multicasts Status messages that summarize its state. When other replicas receive a Status message, they retransmit messages they have sent in the past that Ri is missing. Each replica sends Status messages periodically. Also, a replica sends a Status message when it detects that it is missing information, for example, when it receives a message for sequence number n+1 when it has not yet received a pre-prepare message for n.

A replica Ri whose current view v is active (not pending) multicasts a Status messages with the format <STATUS-ACTIVE,v,ls,le,i,P,C>. Here, ls is the sequence number of the last stable checkpoint, le is the sequence number of the last request Ri has executed, P contains a bit for every sequence number between le and H (the high water mark) indicating whether that request prepared at Ri, and C is similar but indicates whether the request committed at Ri.

If the replica's current view is pending, it multicasts a status message with a different format to trigger retransmission of view-change protocol messages. The format is <STATUS-PENDING,v,ls,le,i,n,V,R>. Here, the components with the same name have the same meaning, n is a flag that indicates whether Ri has the new-view message, V is a set with a bit for each replica that indicates whether Ri has accepted a view-change message for v from that replica, and R is a set with tuples <n,u> indicating that Ri is missing a request that prepared in view u with sequence number n. R is used only if Ri is v's primary to obtain missing requests to propagate to the new view.

If a replica Rj is unable to validate a status message, it sends its last new-key message to Ri. Otherwise, Rj sends messages it sent in the past that Ri may be missing. For example, if Ri is in a view less than Rj's, Rj sends Ri its latest view-change message, or if Rj sent a commit for a sequence number with an unset bit in C, it retransmits that commit to Ri. In all these cases, Rj authenticates the messages it retransmits with the latest keys it received in a new-key message from Rj. This ensures liveness with frequent key changes.

A replica may learn about a stable checkpoint beyond the high water mark in its log by receiving checkpoint messages or as the result of a view change. In this case, it uses the state transfer mechanism to fetch modifications to the service state that it is missing.

The state transfer mechanism is efficient in bringing a replica up to date during recovery. Since proactive recoveries occur relatively frequently, state transfers may also be required relatively frequently. The state transfer mechanism avoids transferring the complete state. This mechanism also ensures that the transferred state is correct. We start by describing our data structures and then explain how they are used by the state transfer mechanism.

The state transfer mechanism uses of hierarchical state partitions to reduce the amount of information transferred. The root partition corresponds to the entire service state and each non-leaf partition is divided into s equal-sized, contiguous sub-partitions. We call the leaf partitions "pages."

Each replica maintains one logical copy of the partition tree for each checkpoint. The copy is created when the checkpoint is taken and it is discarded when a later checkpoint becomes stable. The tree for a checkpoint stores a tuple <lm,d> for each non-leaf partition and a tuple <lm,d,p> for each page. Here, lm is the sequence number of the checkpoint at the end of the last checkpoint interval where the partition was modified, d is the digest of the a partition, and p is the value of the page.

The digests are computed efficiently as follows. For a page, d is obtained by applying the MD5 hash function to the string obtained by concatenating the index of the page within the state, its value of lm and p. For non-leaf partitions, d is obtained by applying MD5 to the string obtained by concatenating the index of the partition within its level, its value of lm, and the sum modulo a large integer of the digests of its sub-partitions. Thus, we apply an incremental hash approach, called AdHash, at each non-leaf level. This construction has the advantage that the digests for a checkpoint can be obtained efficiently by updating the digests from the previous checkpoint incrementally.

The copies of the partition tree are logical because we use copy-on-write so that only copies of the tuples modified since the checkpoint was taken are stored. This reduces the space and time overheads for maintaining these trees significantly.

The strategy to fetch state is to recurse down the hierarchy to determine which partitions are out of date. This reduces the amount of information about (both non-leaf and leaf) partitions that needs to be fetched.

A replica Ri multicasts <FETCH,l,x,lc,c,k,i> to all replicas to obtain information for the partition with index x in level l of the tree. Here, lc is the sequence number of the last checkpoint Ri knows for the partition, and c is either −1 or it specifies that Ri is seeking the value of the. partition at sequence number c from replica Rk.

When a replica Ri determines that it needs to initiate a state transfer, it multicasts a fetch message for the root partition with lc equal to its last checkpoint. The value of c is non-zero when Ri knows the correct digest of the partition information at checkpoint c, e.g., after a view change completes Ri knows the digest of the checkpoint that propagated to the new view but might not have it. Ri also creates a new (logical) copy of the tree to store the state it fetches and initializes a table LC in which it stores the number of the latest checkpoint reflected in the state of each partition in the new tree. Initially each entry in the table will contain lc.

If the designated replier, Rk, receives <FETCH,l,x,lc,c,k,i> and has a checkpoint for sequence number c, it sends back <META-DATA,c,l,x,P,k>, where P is a set with a tuple <x',lm,d> for each sub-partition of (l,x) with index x', digest d, and lm>lc. Since Ri knows the correct digest for the partition value at checkpoint c, it can verify the correctness of the reply without the need for voting or even authentication. This reduces the burden imposed on other replicas.

The other replicas only reply to the fetch message if they have a stable checkpoint greater than lc and c. Their replies are similar to Rk's except that c is replaced by the sequence number of their stable checkpoint and the message contains a MAC. These replies are necessary to guarantee progress when replicas have discarded a specific checkpoint requested by Ri.

Replica Ri retransmits the fetch message (choosing a different Rk each time) until it receives a valid reply from some k or f+1 equally fresh responses with the same sub-partition values for the same sequence number cp (greater than lc and c). Then, it compares its digests for each sub-partition of (l,x) with those in the fetched information; it multicasts a fetch message for sub-partitions where there is a difference, and sets the value in LC to c (or cp) for the sub-partitions that are up to date. Since Ri learns the correct digest of each sub-partition at checkpoint c (or cp) it can use the optimized protocol to fetch them.

The protocol recurses down the tree until Ri sends fetch messages for out-of-date pages. Pages are fetched like other partitions except that meta-data replies contain the digest and last modification sequence number for the page rather than sub-partitions, and the designated replier sends back <DATA, x,p>. Here, x is the page index and p is the page value. The protocol imposes little overhead on other replicas; only one replica replies with the full page and it does not even need to compute a MAC for the message since Ri can verify the reply using the digest it already knows.

When Ri obtains the new value for a page, it updates the state of the page, its digest, the value of the last modification sequence number, and the value corresponding to the page in LC. Then, the protocol goes up to its parent and fetches another missing sibling. After fetching all the siblings, it checks if the parent partition is "consistent." A partition is consistent up to sequence number c, if c is the minimum of all the sequence numbers in LC for its sub-partitions, and c is greater than or-equal to the maximum of the last modification sequence numbers in its sub-partitions. If the parent partition is not consistent, the protocol sends another fetch for the partition. Otherwise, the protocol goes up again to its parent and fetches missing siblings.

The protocol ends when it visits the root partition and determines that it is consistent for some sequence number c. Then the replica can start processing requests with sequence numbers greater than c.

Since state transfer happens concurrently with request execution at other replicas, it may take some time for a replica to complete the protocol. For instance, each time it fetches a missing partition, it receives information about yet a later modification. This has not been observed to be a problem in experimental implementation of the system. Furthermore, if the replica fetching the state ever is actually needed (because others have failed), the system will wait for it to catch up.

One embodiment of the approach described above makes use of a software implementation of a generic software library with a simple interface that is used to provide Byzantine-fault-tolerant versions of different services. One example of a fault-tolerant system that makes use of such a library implements a replicated networked file system (NFS) service. In experimental results, the replicated implementation provided latency to client requests within as little as 3% of the latency on an un-replicated service.

Other embodiments are within the scope of the following claims.

What is claimed is:

1. A method for fault tolerant operation of a distributed server system that includes N asynchronous servers that may experience faults, comprising:
   receiving a series of requests from a client over a time interval associated with the requests;
   at each of the N servers, processing some or all of the client requests including, for each of the requests processed at a server, updating a state of a state machine at that server according to the request and transmitting a response to the client; and
   resetting each of the N servers repeatedly during the time interval, wherein resetting a server includes establishing the state of the state machine at that server using data stored at other of the servers so that the state at that server corresponds to a common state of the server system;
   wherein when (a) for a predetermined duration time window, fewer than N/3 of the server systems experience faults in any time window of the time interval of the requests of that predetermined duration, and (b) N/3 or more of the N servers experience faults at some time during the time interval of the requests, the N servers provide responses to the client that are sufficient for the client to determine correct responses to each of the series of requests.

2. The method of claim 1 wherein the faults experienced by the N servers include Byzantine faults.

3. The method of claim 1 wherein the faults experienced by the N servers include faults resulting from denial-of-service attacks in which communication between the servers is interrupted.

4. The method of claim 1 further comprising:
   during the time interval of the requests, identifying a series of master servers from the N servers such that different servers are identified as master servers at different times;
   for each of the requests from the client,
      (a) receiving the request at a master server,
      (b) establishing a common sequence number for the request among greater than ⅔ of the N servers, and
      (c) processing the request at servers at which the common sequence number has been established;
   whereby when ⅓ or fewer of the N servers are faulty, greater than ⅓ of the N servers are not faulty and transmit a response to the client.

5. The method of claim 1 wherein establishing the state of the state machine at a server that has been reset using data stored at other of the servers includes:
   partitioning the state into separate parts;
   retaining the values of the state for the separate parts from prior to resetting the server;
   for each separate part, computing a digest characterizing the retained value of the state in that part, and receiving a sufficient number of digests of that part of the state at other of the N servers to determine whether the digest matches the common value of that part of the state; and
   if for any part of the state the digest computed at the server does not match the digest of the common value of that part of the state, transferring the values of at least some of that part of the state from another of the N servers.

6. The method of claim 5 wherein establishing the state of the state machine at a server that has been reset using data stored at other of the servers further includes:
   partitioning the state into a hierarchy of parts, such that parts of the state are partitioned into sub-parts; and
   if for any part of the state the digest computed at the server does not match the digest of the common value of that part of the state, computing a digest characterizing each of the sub-parts of that part, and receiving a sufficient number of digests of those sub-parts of the state at other of the N servers to determine whether the digests match the common values of those sub-parts of the state.

7. The method of claim 1 wherein processing at least some of the requests include processing a complex operation involving multiple updates to the state machine according to each of those requests.

8. The method of claim 1 further comprising:
at each of the N servers, computing symmetric keys for communicating with each of the other of the N servers, and distributing the symmetric keys to the other servers; and
repeating the steps of computing and distributing the keys during the time interval.

9. The method of claim 8 wherein distributing the symmetric keys to the other servers includes encrypting the keys in a message using public key cryptography.

10. In a distributed computer system that includes one or more clients and 3F+1 server nodes which in normal operation operate asynchronously and implement a common state machine and during faulty operation F or fewer of the server nodes are concurrently faulty, a method for fault-tolerant operation comprising:
receiving a request from a client at a designated master node of the 3F+1 server nodes;
establishing a common sequence number for the request among at least 2F+1 of the 3F+1 server nodes using a three-phase message exchange, during the first phase sending a first message from the designated master node to other of the server nodes identifying the received request, during a second phase sending a second message from each non-faulty server node that received the first message to all other of the server nodes, and during a third phase, sending a third message from each of the non-faulty server nodes that received the second message to all other of the server nodes; and
at each of F+1 or greater of the 3F+1 server nodes that are not faulty and that received the third message, processing the request and transmitting a result to the client.

11. The method of claim 10 wherein the steps of receiving a request from a client, establishing a common sequence number for the request, and processing and transmitting the result are repeated for multiple subsequent requests.

12. The method of claim 11 wherein establishing the common sequence number for a subsequent request occurs prior to completion of the processing of a request received prior to that request.

* * * * *